(12) United States Patent
Hur et al.

(10) Patent No.: US 12,516,842 B2
(45) Date of Patent: Jan. 6, 2026

(54) DEVICE AND METHOD FOR RECOVERING THERMAL ENERGY IN ROOM

(71) Applicant: SAMSUNG ELECTRONICS CO., LTD., Suwon-si (KR)

(72) Inventors: Jaehun Hur, Suwon-si (KR); Yonghoon Kim, Suwon-si (KR); Yunnam Kim, Suwon-si (KR); Jaeyang Lee, Suwon-si (KR); Changyong Lee, Suwon-si (KR); Seokhyun Jang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 498 days.

(21) Appl. No.: 17/989,364

(22) Filed: Nov. 17, 2022

(65) Prior Publication Data

US 2023/0151996 A1     May 18, 2023

Related U.S. Application Data

(63) Continuation of application No. PCT/KR2022/017532, filed on Nov. 9, 2022.

(30) Foreign Application Priority Data

Nov. 17, 2021    (KR) ........................ 10-2021-0158714

(51) Int. Cl.
    *F24F 11/81*      (2018.01)
    *F24F 11/523*     (2018.01)
    (Continued)

(52) U.S. Cl.
    CPC ............ *F24F 11/81* (2018.01); *F24F 11/523* (2018.01); *F24F 12/006* (2013.01); *F24F 2110/10* (2018.01); *F24F 2120/20* (2018.01)

(58) Field of Classification Search
    CPC ........ F24F 11/81; F24F 11/523; F24F 12/006; F24F 2120/20; F24F 2110/10
    (Continued)

(56) References Cited

U.S. PATENT DOCUMENTS 5,082,173 A    1/1992   Poehlman et al.
7,261,241 B2 *   8/2007   Eoga .................. G05D 23/1919
                                                 165/247

(Continued)

FOREIGN PATENT DOCUMENTS

CN         106352446 A     1/2017
CN         106461254 B     6/2019

(Continued)

OTHER PUBLICATIONS

International Search Report, PCT/ISA/210, and Written Opinion, PCT/ISA/237, dated Feb. 16, 2023, in PCT/KR2022/017532.

(Continued)

*Primary Examiner* — Avinash A Savani
*Assistant Examiner* — Dana K T
(74) *Attorney, Agent, or Firm* — STAAS & HALSEY LLP

(57) ABSTRACT

Provided are an air conditioning device and method. The air conditioning control device includes a ventilation fan, a memory storing at least one instruction, and at least one processor connected to the memory, in which the at least one processor is configured to, by executing the at least one instruction, determine, among a plurality of rooms, a first room from which thermal energy is to be recovered and a second room to which the thermal energy to be recovered is to be supplied, based on at least one of a sensor value of a sensor in a room among the plurality of rooms, a use schedule of at least one room among the plurality of rooms, and a user input, and drive the ventilation fan to exchange (Continued)

thermal energy of the first room and thermal energy of the second room.

20 Claims, 20 Drawing Sheets

(51) Int. Cl.
*F24F 12/00* (2006.01)
*F24F 110/10* (2018.01)
*F24F 120/20* (2018.01)

(58) Field of Classification Search
USPC .......................................................... 454/261
See application file for complete search history.

(56) References Cited

U.S. PATENT DOCUMENTS

| | | | | |
|---|---|---|---|---|
| 8,020,777 | B2* | 9/2011 | Kates | ............... F24F 11/62 |
| | | | | 165/208 |
| 8,418,491 | B2 | 4/2013 | Matsui | |
| 8,442,694 | B2* | 5/2013 | Jang | ............... F24F 11/77 |
| | | | | 454/258 |
| 9,727,041 | B2 | 8/2017 | Yamada | |
| 10,242,129 | B2* | 3/2019 | Flaherty | ............... F24F 11/62 |
| 11,353,233 | B2 | 6/2022 | Funada et al. | |
| 11,686,498 | B2* | 6/2023 | Conrad | ............... F24F 11/46 |
| | | | | 700/276 |
| 2009/0166442 | A1* | 7/2009 | Stark | ............... F24F 12/006 |
| | | | | 236/44 C |
| 2015/0369503 | A1 | 12/2015 | Flaherty et al. | |
| 2017/0016646 | A1 | 1/2017 | Lee | |
| 2017/0051937 | A1 | 2/2017 | Toyoshima et al. | |
| 2019/0145642 | A1* | 5/2019 | Heigl | ............... F24F 13/10 |
| | | | | 454/239 |
| 2021/0389004 | A1 | 12/2021 | Ashino | |

FOREIGN PATENT DOCUMENTS

| | | |
|---|---|---|
| CN | 113418282 A | 9/2021 |
| JP | 2000-234777 | 8/2000 |
| JP | 2004-116972 | 4/2004 |
| JP | 3972014 | 9/2007 |
| JP | 4581604 | 11/2010 |
| JP | 5837020 | 12/2015 |
| JP | 6021937 | 11/2016 |
| JP | 2018-165600 | 10/2018 |
| JP | 6865357 | 4/2021 |
| KR | 10-0959004 | 5/2010 |
| KR | 10-1013377 | 2/2011 |
| KR | 10-2011-0060221 | 6/2011 |
| KR | 10-1203999 | 11/2012 |
| KR | 10-1344461 | 12/2013 |
| KR | 10-1511301 | 4/2015 |
| KR | 10-2019-0122074 | 10/2019 |
| KR | 10-2196725 | 12/2020 |
| WO | WO 2020/064073 A1 | 4/2020 |
| WO | WO 2020/136774 A1 | 7/2020 |

OTHER PUBLICATIONS

European Search Report dated Sep. 12, 2024, in European Application No. EP 22 89 5957.

* cited by examiner

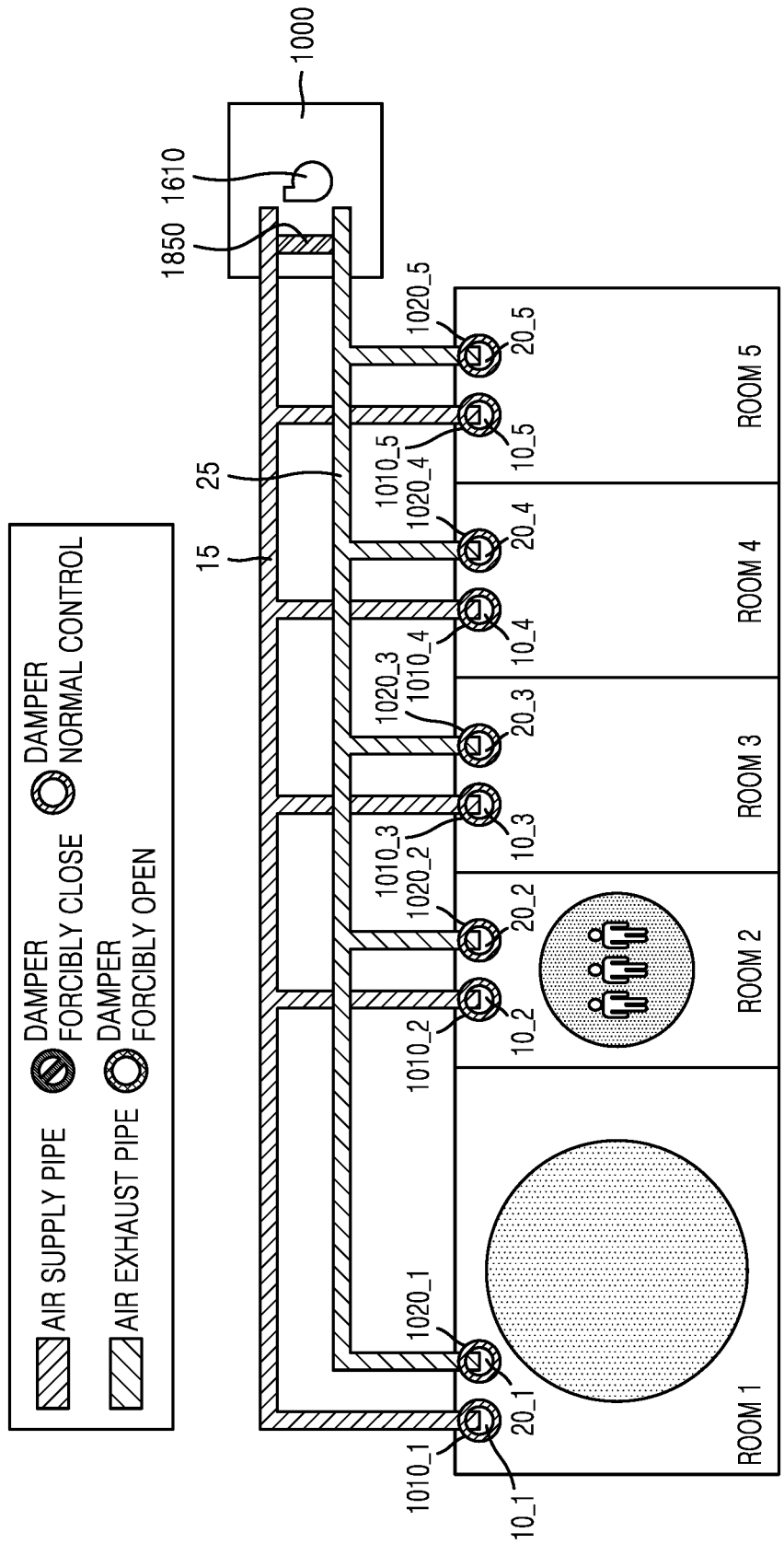

DEVICE AND METHOD FOR RECOVERING THERMAL ENERGY IN ROOM

CROSS REFERENCE TO RELATED APPLICATIONS

This application is a continuation application of International Application No. PCT/KR2022/017532, filed on Nov. 9, 2022, and claims priority to Korean Patent Application No. 10-2021-0158714, filed on Nov. 17, 2021, the disclosures of which are incorporated by reference herein in their entireties.

BACKGROUND

1. Field

The disclosure relates to an electronic device and an operating method thereof. More particularly, the disclosure relates to a method, performed by an electronic device, of recovering heat remaining in a room, and the electronic device.

2. Description of Related Art

Recently, eco-friendly technologies related to energy reuse have been developed due to climate change. More specifically, there is a need for technology capable of reducing wasted energy by reusing or recycling unused energy.

In addition, with the growing interest in the residential environment, facilities for an air conditioning system are increasing in each space to keep the air in the house comfortable. For example, in each room of the house, an air outlet and an air inlet are provided, and an air conditioner, an air quality sensor, etc., are provided.

Thus, a method of utilizing wasted energy in a room using such an air conditioning facility is required.

SUMMARY

Aspects of embodiments will be set forth in part in the description which follows and, in part, will be apparent from the description, or may be learned by practice of embodiments.

According to an embodiment, an air conditioning control device may include a ventilation fan; a memory storing at least one instruction; and at least one processor configured to, by executing the at least one instruction: (a) determine, among a plurality of rooms, a first room from which thermal energy is to be recovered and a second room to which the thermal energy to be recovered is to be supplied, based on at least one of a sensor value of a sensor in a room among the plurality of rooms, a use schedule of at least one room among the plurality of rooms, and a user input, and (b) drive the ventilation fan to suck air of the first room through an air outlet of the first room, to suck air of the second room through an air outlet of the second room, to exchange thermal energy between the sucked air of the first room and the sucked air of the second room, and to discharge the air of the first room and the air of the second room in which the thermal energy is exchanged, to an air inlet of the first room and an air inlet of the second room.

According to an embodiment, to exchange thermal energy between the sucked air of the first room and the sucked air of the second room, the at least one processor may be configured to, by executing the at least one instruction, drive the ventilation fan to mix the sucked air of the first room with the sucked air of the second room, and, to discharge the air of the first room and the air of the second room in which the thermal energy is exchanged, the at least one processor may be configured to, by executing the at least one instruction, discharge the sucked air of the first room and the sucked air of the second room, which are mixed, to the air inlet of the first room and the air inlet of the second room.

According to an embodiment, the ventilation fan may be between an air exhaust pipe connecting air outlets of the plurality of rooms and an air supply pipe connecting air inlets of the plurality of rooms. To mix the sucked air of the first room with the sucked air of the second room and to discharge the sucked air of the first room and the sucked air of the second room, which are mixed, the at least one processor may be further configured to, by executing the at least one instruction: open the air inlets and the air outlets of the first room and the second room and close air inlets and air outlets of rooms other than the first room and the second room among the plurality of rooms, and drive the ventilation fan to mix the sucked air of the first room with the sucked air of the second room in the air exhaust pipe and the air supply pipe, and circulate the mixed air between the first room and the second room.

According to an embodiment, the air conditioning control device may further include a heat exchange element, wherein, to exchange thermal energy between the sucked air of the first room and the sucked air of the second room, the at least one processor may be configured to, by executing the at least one instruction, cause the sucked air of the first room and the sucked air of the second room to pass through the heat exchange element. To discharge the air of the first room and the air of the second room in which the thermal energy is exchanged, the at least one processor may be configured to, by executing the at least one instruction, discharge the sucked air of the first room in which the thermal energy is exchanged to the air inlet of the first room, and discharge the air of the second room in which the thermal energy is exchanged to the air inlet of the second room.

According to an embodiment, the at least one processor may be further configured to, by executing the at least one instruction, perform the exchange of thermal energy and air conditioning together by mixing the sucked air of the second room with outside air prior to the sucked air of the second room being passed through the heat exchange element.

According to an embodiment, the at least one processor may be further configured to, by executing the at least on instruction, cause the exchange of thermal energy and cooling and heating to be performed together, by controlling an air conditioning unit in the second room together with the exchange of thermal energy.

According to an embodiment, each room of the plurality of rooms may have a corresponding first pipeline control unit and a corresponding second pipeline control unit, each room of the plurality of rooms may have an air outlet connectable to an air exhaust pipe or a heat recovery air exhaust pipe by the corresponding first pipeline control unit, each room of the plurality of rooms may have an air inlet connectable to an air supply pipe or a heat recovery air supply pipe by the corresponding second pipeline control unit, the air exhaust pipe may be connected to the heat recovery air supply pipe and the air supply pipe may be connected to the heat recovery air exhaust pipe, in the heat exchange element, and the at least one processor may be further configured to, by executing the at least one instruction, control the first pipeline control unit and the second pipeline control unit corresponding to each room of the plurality of rooms, in association with driving of the ventilation fan, to exchange thermal energy between the sucked air of the first room and the sucked air of the second room.

According to an embodiment, the at least one processor may be further configured to, by executing the at least one instruction, stop driving the ventilation fan as a difference between a temperature of the first room and a temperature of the second room decreases to a preset temperature difference or less.

According to an embodiment, the air conditioning control device may further includes a user input unit, wherein the at least one processor may be further configured to, by executing the at least one instruction: receive a user input to set an energy recovery threshold time through the user input unit, and stop driving the ventilation fan as the set energy recovery threshold time has elapsed since start of driving of the ventilation fan.

According to an embodiment, the air conditioning control device may further include a user input unit and a display, wherein the at least one processor may be further configured to, by executing the at least one instruction: display, on the display, a room selection menu showing at least one of the sensor value and the use schedule, together with identification information of the plurality of rooms, and receive a user input to select the first room from which thermal energy is to be recovered and the second room to which thermal energy is to be supplied, from among the plurality of rooms, through the user input unit.

According to an embodiment, a method may include: (a) determining, among a plurality of rooms, a first room from which thermal energy is to be recovered and a second room to which the thermal energy to be recovered is to be supplied, based on at least one of a sensor value of a sensor in a room among the plurality of rooms, a use schedule of at least one room among the plurality of rooms, and a user input; and (b) driving a ventilation fan to suck air of the first room through an air outlet of the first room, to suck air of the second room through an air outlet of the second room, to exchange thermal energy between the sucked air of the first room and the sucked air of the second room, and to discharge the air of the first room and the air of the second room in which the thermal energy is exchanged to an air inlet of the first room and an air inlet of the second room.

According to an embodiment, the driving the ventilation fan to exchange thermal energy between the sucked air of the first room and the sucked air of the second room may include driving the ventilation fan to mix the sucked air of the first room with the sucked air of the second room, and the driving the ventilation fan to discharge the air of the first room and the air of the second room in which the thermal energy is exchanged may include driving the ventilation fan to discharge the sucked air of the first room and the sucked air of the second room, which are mixed, to the air inlet of the first room and the air inlet of the second room.

According to an embodiment, the ventilation fan may be between an air exhaust pipe connecting air outlets of the plurality of rooms and an air supply pipe connecting air inlets of the plurality of rooms, and the driving the ventilation fan to mix the sucked air of the first room with the sucked air of the second room and the driving the ventilation fan to discharge the sucked air of the first room and the sucked air of the second room, which are mixed, may include: opening the air inlets and the air outlets of the first room and the second room, closing air inlets and air outlets of rooms other than the first room and the second room among the plurality of rooms, and driving the ventilation fan to mix the sucked air of the first room with the sucked air of the second room in the air exhaust pipe and the air supply pipe, and to circulate the mixed air between the first room and the second room.

According to an embodiment, to exchange thermal energy between the sucked air of the first room and the sucked air of the second room, the driving the ventilation fan may include driving the ventilation fan to cause the sucked air of the first room and the sucked air of the second room to pass through a heat exchange element, and, to discharge the air of the first room and the air of the second room in which the thermal energy is exchanged, the driving the ventilation fan may include driving the ventilation fan to discharge the sucked air of the first room in which thermal energy is exchanged to the air inlet of the first room, and to discharge the air of the second room in which thermal energy is exchanged to the air inlet of the second room.

According to an embodiment, the driving the ventilation fan to exchange thermal energy between the sucked air of the first room and the sucked air of the second room may include driving the ventilation fan to cause the exchange of thermal energy and air conditioning to be performed together by mixing the sucked air of the second room with outside air prior to the sucked air of the second room being passed through the heat exchange element.

According to an embodiment, the method may further include performing thermal energy exchange and cooling and heating together by controlling an air conditioning unit in the second room.

According to an embodiment, each room of the plurality of rooms may have a corresponding first pipeline control unit and a corresponding second pipeline control unit, each room of the plurality of room may have an air outlet connectable to an air exhaust pipe or a heat recovery air exhaust pipe by the corresponding first pipeline control unit, each room of the plurality of rooms may have an air inlet connectable to an air supply pipe or a heat recovery air supply pipe by the corresponding second pipeline control unit, the air exhaust pipe may be connected to the heat recovery air supply pipe and the air supply pipe may be connected to the heat recovery air exhaust pipe, in the heat exchange element, and, to exchange thermal energy between the sucked air of the first room and the sucked air of the second room, the method may include controlling the first pipeline control unit and the second pipeline control unit corresponding to each room of the plurality of rooms, in association with driving of the ventilation fan, to exchange thermal energy between the sucked air of the first room and the sucked air of the second room.

According to an embodiment, the method may include stopping driving the ventilation fan as a difference between a temperature of the first room and a temperature of the second room decreases to a preset temperature difference or less.

According to an embodiment, the method may include receiving a user input to set an energy recovery threshold time; and stopping driving the ventilation fan as the set energy recovery threshold time has elapsed since start of driving of the ventilation fan.

According to an embodiment, the method may further include displaying a room selection menu showing at least one of the sensor value or the use schedule, together with identification information of the plurality of rooms; and receiving a user input to select the first room from which thermal energy is to be recovered and the second room to which thermal energy is to be supplied, from among the plurality of rooms, through the room selection menu.

According to an embodiment, an apparatus may include at least one memory storing instructions; and at least one processor configured to, by executing the instructions, perform control to: (a) determine, among a plurality of rooms, a first room from which thermal energy is to be recovered and a second room to which the thermal energy to be recovered is to be supplied, based on at least one of a sensor value of a sensor in a room among the plurality of rooms, a use schedule of at least one room among the plurality of rooms, and a user input, (b) suck air from the first room and air from the second room, (c) exchange thermal energy between the air sucked from the first room and the air sucked from the second room, and (d) discharge the air sucked from the first room and the air sucked from the second room, in which the thermal energy has been exchanged, to the first room and the second room.

BRIEF DESCRIPTION OF DRAWINGS

Aspects, features, and advantages of embodiments of the present disclosure will be more apparent from the following description taken in conjunction with the accompanying drawings, in which:

FIGS. 6A through 6C illustrate a method, performed by an air conditioning control device, of recovering thermal energy in a room, according to an embodiment of the disclosure.

DETAILED DESCRIPTION

Figure 1:
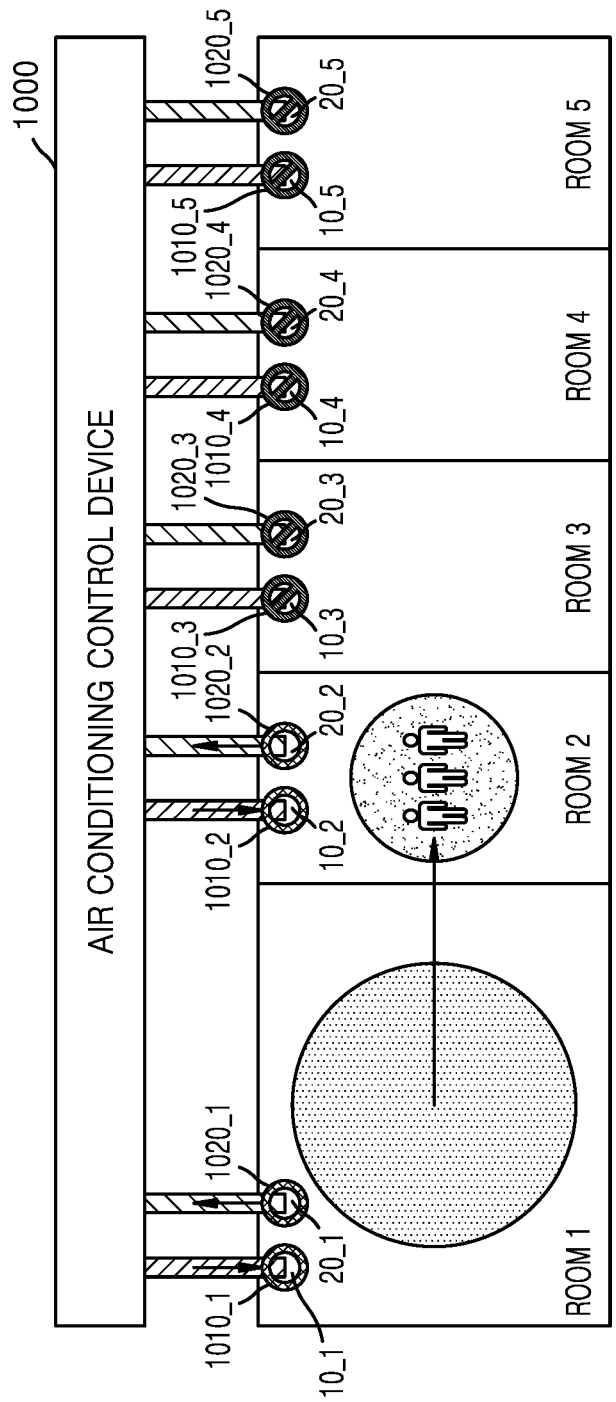
FIG. 1 illustrates a method, performed by an air conditioning control device, of recovering thermal energy remaining in a room by using an air supply facility and an air exhaust facility, according to an embodiment of the disclosure.

Throughout the disclosure, the expression "at least one of a, b or c" indicates only a, only b, only c, both a and b, both a and c, both b and c, all of a, b, and c, or variations thereof.

Hereinafter, embodiments of the disclosure will be described in detail with reference to the attached drawings to allow those of ordinary skill in the art to easily carry out the embodiments of the disclosure. However, the disclosure may be implemented in various different forms, and are not limited to the embodiments of the disclosure described herein. To clearly describe the disclosure, parts that are not associated with the description have been omitted from the drawings, and throughout the specification, identical reference numerals refer to identical parts.

Although terms used in the disclosure are selected with general terms popularly used at present under the consideration of functions in the disclosure, the terms may vary according to the intention of those of ordinary skill in the art, judicial precedents, or introduction of new technology. Thus, the terms used in the disclosure should be defined not by the simple names of the terms but by the meaning of the terms and the contents throughout the disclosure.

In addition, the terms, first, second, etc., may be used to describe various components, but the components should not be limited by these terms. These terms are used to distinguish one component from another component.

Moreover, terms used herein are used for only describing a specific exemplary embodiment and may not have an intention to limit the disclosure. Singular expressions include plural forms unless apparently indicated otherwise contextually. Further, throughout the specification, when any portion is "connected" to another portion, it may include not only a case where they are "directly connected", but also a case where they are "electrically connected" with another element therebetween. When a portion is referred to as "comprises" a component, the portion may not exclude another component but may further include another component unless stated otherwise.

The phrase "in some embodiments" or "in one embodiment" in various parts of the present specification all does not necessarily indicate the same embodiment.

Various embodiments of the disclosure provide an electronic device and a method of controlling the same, in which waste heat in a room that is not used is moved to a room to be used.

FIG. 1 illustrates a method, performed by an air conditioning control device, of recovering thermal energy remaining in a room by using an air supply facility and an air exhaust facility, according to an embodiment of the disclosure.

Referring to FIG. 1, there are a plurality of rooms in a building and each room may include air inlets 10_1 through 10_5 and air outlets 20_1 through 20_5.

As shown in FIG. 1, when there are several separate rooms in a building, each room may be separately cooled and heated. A user may operate a chiller while staying in Room 1, and as the chiller operates, cold energy may increase in Room 1. Even when the user leaves Room 1 after terminating the use of Room 1, cold energy may remain in Room 1. However, thermal energy may not exchange between rooms, such that cold energy remaining in Room 1 may be wasted.

According to an embodiment of the disclosure, an air conditioning control device 1000 may determine, among a plurality of rooms, a first room from which thermal energy is to be recovered and a second room to which the thermal energy to be recovered is to be supplied, based on at least one of a sensor value received from a sensor in the plurality of rooms, a use schedule of the plurality of rooms, or a user input.

For example, referring to FIG. 1, the air conditioning control device 1000 may determine Room 1 as the first room from which thermal energy is to be recovered, and determine Room 2 as the second room to which the thermal energy to be recovered is to be supplied.

The air conditioning control device 1000 according to an embodiment of the disclosure may exchange the thermal energy between the determined first room and second room.

For example, the air conditioning control device 1000 may close the air outlets 20_3, 20_4, and 20_5 and the air inlets 10_3, 10_4, and 10_5 of the other rooms than the first room and the second room, open the air outlet 20_1 of the first room to suck the air in the first room by controlling an air outlet regulator 1020_1 provided in the air outlet 20_1 of the first room, and suck the air in the second room to the air outlet 20_2 of the second room by controlling an air outlet regulator 1020_2 provided in the air outlet 20_2 of the second room.

In addition, the air conditioning control device 1000 may exchange thermal energy in the sucked air of the first room and thermal energy in the sucked air of the second room.

Moreover, the air conditioning control device 1000 may open the air inlet 10_1 of the first room and the air inlet 10_2 of the second room by controlling the air inlet regulator 1010_1 provided in the air inlet 10_1 of the first room and the air inlet regulator 1010_2 provided in the air inlet 10_2 of the second room, thereby discharging the air of the first room and the air of the second room where thermal energy is exchanged to the air inlet 10_1 of the first room and the air inlet 10_2 of the second room.

According to an embodiment of the disclosure, the air conditioning control device 1000 may mix the air sucked from the first room with the air sucked from the second room, thus exchanging thermal energy between the two volumes of air.

In addition, according to another embodiment of the disclosure, the air conditioning control device 1000 may exchange thermal energy of the air sucked from the first room with thermal energy of the air sucked from the second room, by using a heat exchange element.

Thus, the air conditioning control device 1000 may move thermal energy of the first room to the second room.

The air outlet regulators 1020_1 to 1020_5 and the air inlet regulators 1010_1 to 1010_5 may include, but are not limited to, a damper or a pipeline regulating means.

According to an embodiment of the disclosure, the room may be a space that may be closed, such as a room in the house, or a partially open space that is not closed, such as a living room or a kitchen.

In addition, according to an embodiment of the disclosure, thermal energy may be hot energy or cold energy. For example, when the temperature of the air in Room 1 is lower than a reference temperature due to an air conditioner, Room 1 may be determined to include cold energy. In this case, the air conditioning control device 1000 may determine Room 1 as the first room from which cold energy is to be recovered.

In addition, when the temperature of the air in Room 1 is higher than the reference temperature due to a hot-air blower or a heater, Room 1 may be determined to include hot energy. In this case, the air conditioning control device 1000 may determine Room 1 as the first room from which hot energy is to be recovered.

The reference temperature may be, for example, but is not limited to, 24 degrees Celsius (° C.). The reference temperature may change with a user's settings, a season, or an outside temperature. Depending on an embodiment of the disclosure, thermal energy remaining in the room may be referred to as waste thermal energy.

Figure 2:
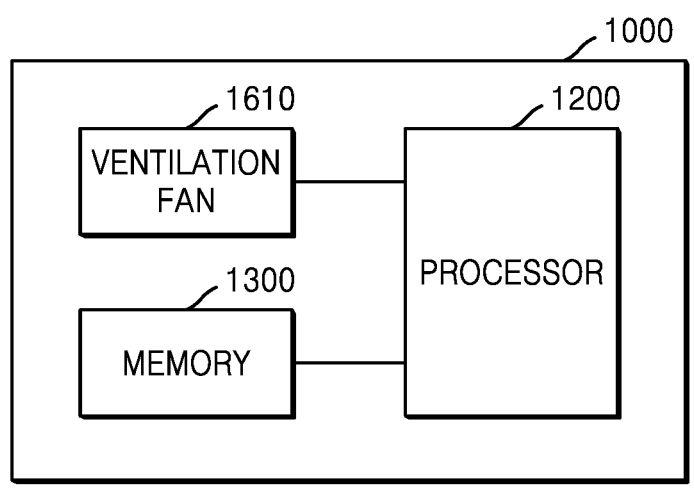
FIG. 2 is a device diagram of an air conditioning control device, according to an embodiment of the disclosure.

FIG. 2 is a device diagram of an air conditioning control device, according to an embodiment of the disclosure.

Referring to FIG. 2, the air conditioning control device 1000 may include a processor 1200, a memory 1300, and a ventilation fan 1610.

The ventilation fan 1610 may include a driving motor (not shown) and fan blades. The ventilation fan 1610 may move the ambient air by rotating the fan blades connected to the driving motor (not shown). As indicated above, singular expressions used herein may include plural forms. Accordingly, the ventilation fan 1610 may be implemented as a single fan or a plurality of fans.

The memory 1300 may store a program for processing and control by the processor 1200, and store identification information of a room and identification information of an air inlet regulator (not shown) and an air outlet regulator (not shown) corresponding to the identification of the room.

The processor 1200 may determine, among a plurality of rooms, the first room from which thermal energy is to be recovered and the second room to which the thermal energy to be recovered is to be supplied, based on at least one of a sensor value received from a sensor in a room of the plurality of rooms, a use schedule of at least one room of the plurality of rooms, or a user input. Here, "at least one of" indicates that, in various embodiments, that the processor 1200 may determine the first room and the second room based on any of the following: (a) a sensor value received from a sensor in a room of the plurality of rooms, (b) a use schedule of at least one room of the plurality of rooms, (c) a user input, (d) a sensor value received from a sensor in a room of the plurality of rooms and a use schedule of at least one room of the plurality of rooms, (e) a sensor value received from a sensor in a room of the plurality of rooms and a user input, (f) a use schedule of at least one room of the plurality of rooms and a user input, and (g) a sensor value received from a sensor in a room of the plurality of rooms, a use schedule of at least one room of the plurality of rooms, and a user input.

The processor 1200 may exchange thermal energy between the air of the first room sucked through the air outlet of the first room and the air of the second room sucked through the air outlet of the second room and discharge the air of the first room and the air of the second room where the thermal energy is exchanged to the air inlet of the first room and the air inlet of the second room, by driving the air outlet regulator (not shown) and the air inlet regulator (not shown).

The processor 1200 and the ventilation fan 1610 may be configured as one device, or may be separated from each other and connected to each other in a wired or wireless manner.

According to another embodiment of the disclosure, the air conditioning control device 1000 may include a heat exchange element. According to another embodiment of the disclosure, the air conditioning control device 1000 may include a chiller/heater. Thus, the air conditioning control device 1000 may be referred to as a total heat exchanger, an energy recovery ventilator (ERV), an air conditioner, a system air conditioner, an air conditioning unit, etc.

Figure 3:
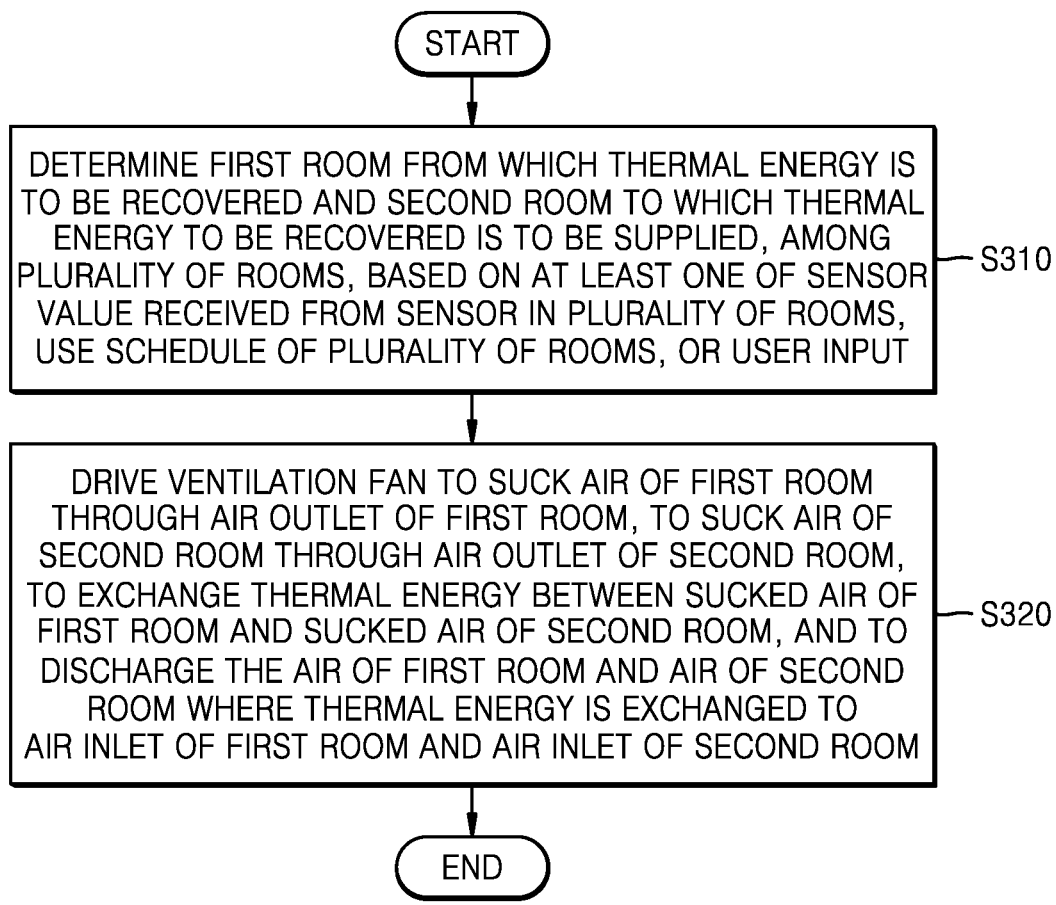
FIG. 3 is a flowchart of a method, performed by an air conditioning control device, of recovering thermal energy remaining in a room by using an air supply facility and an air exhaust facility, according to an embodiment of the disclosure.

FIG. 3 is a flowchart of a method, performed by an air conditioning control device, of recovering thermal energy remaining in a room by using an air supply facility and an air exhaust facility, according to an embodiment of the disclosure.

In operation S310, the air conditioning control device 1000 may determine a sensor value received from a sensor in a plurality of rooms, a use schedule of a plurality of rooms, and a user input, and determine a first room to which thermal energy is to be recovered and a second room to which the thermal energy to be recovered is to be supplied, among the plurality of rooms.

A room may include a temperature sensor. The room may also include at least one of a humidity sensor, a human body detection sensor, or an air quality sensor.

The air conditioning control device 1000 according to an embodiment of the disclosure may determine a room the user leaves or a room the user enters among the plurality of rooms, based on a detection value of the human body detection sensor of the room.

The human body detection sensor may detect whether the user is present in the room, whether the user enters the room, or whether the user leaves the room. The human body detection sensor may include, but is not limited to, an image sensor, an infrared sensor, an ultrasonic sensor, a lidar sensor, a contact controller, etc.

For example, the air conditioning control device 1000 may determine that all users having stayed in Room 1 leave Room 1, based on the detection value of the human body detection sensor in Room 1. More specifically, when the air conditioning control device 1000 receives a signal indicating that the user is not present in Room 1 from the infrared sensor in Room 1 or a signal indicating that all lights are turned off from the contact controller, the air conditioning control device 1000 may determine that all users having stayed in Room 1 leave Room 1.

In addition, the air conditioning control device 1000 may determine that the user enters Room 2, based on the detection value of the human body detection sensor in Room 2. For example, when the air conditioning control device 1000 receives the signal indicating the user is present in Room 2 from the infrared sensor or a signal indicating that a light is turned on from the contact controller, the air conditioning control device 1000 may determine that the user enters Room 2.

The air conditioning control device 1000 according to an embodiment of the disclosure may also determine a room that is finished being used or a room that is to be used, based on a use schedule. The air conditioning control device 1000 may receive information about a room use schedule from a device of the user. According to an embodiment of the disclosure, the air conditioning control device 1000 may receive a user input to set the room use schedule. The air conditioning control device 1000 may determine the room finished being used as a room from which thermal energy is to be recovered and the room to be used as a room to which thermal energy is to be supplied, based on the room use schedule.

The air conditioning control device 1000 according to an embodiment of the disclosure may determine a room requiring thermal energy between a room the user enters and the room to be used.

For example, the air conditioning control device 1000 may determine, based on a reference temperature, that Room 2 requires thermal energy, when an inside temperature of Room 2 between the room the user enters and the room to be used is directed in the same direction as an outside temperature, which deviates from the reference temperature.

More specifically, the air conditioning control device 1000 may determine that Room 2 requires thermal energy, when a sign of a value obtained by subtracting the reference temperature from the outside temperature is the same as a sign of a value obtained by subtracting the reference temperature from the inside temperature of Room 2. For example, when the reference temperature is 25 degrees, the outside temperature is 29 degrees, and the inside temperature is 27 degrees, the sign of the value obtained by subtracting the reference temperature from the outside temperature is the same as the sign of the value obtained by subtracting the reference temperature from the inside temperature and the outside temperature is higher than the inside temperature, such that the air conditioning control device 1000 may determine that Room 2 requires cold energy. In another example, when the reference temperature is 25 degrees, the outside temperature is 19 degrees, and the inside temperature of Room 2 is 22 degrees, the sign of the value obtained by subtracting the reference temperature from the outside temperature is the same as the sign of the value obtained by subtracting the reference temperature from the inside temperature and the outside temperature is lower than the inside temperature, such that the air conditioning control device 1000 determines that Room 2 requires hot energy. Thus, the air conditioning control device 1000 may determine Room 2 as the second room that requires thermal energy.

Moreover, the air conditioning control device 1000 according to an embodiment of the disclosure may determine the room to which thermal energy is to be supplied, between a room the user leaves and the room finished being used.

For example, when the second room requires hot energy, the air conditioning control device 1000 may determine a room having an inside temperature higher than the reference temperature between the room the user leaves and the room finished being used as the room to which thermal energy is to be supplied. In another example, when the second room requires cold energy, the air conditioning control device 1000 may determine a room having an inside temperature lower than the reference temperature between the room the user leaves and the room finished being used as the room to which thermal energy is to be supplied.

The reference temperature may change with a user's settings, a season, or an outside temperature. For example, the reference temperature may be a desired temperature set by the user in the air conditioning control device 1000.

According to an embodiment of the disclosure, the air conditioning control device 1000 may determine the first room from which thermal energy is to be recovered and the second room to which the thermal energy to be recovered is to be supplied, based on an air quality in a room as well as a human body detection sensor or a use schedule.

For example, the air conditioning control device 1000 may not recover the thermal energy of the first room when the humidity or the air quality of the first room deviates from a recovery range, even when the first room from which thermal energy is to be recovered and the second room to which thermal energy is to be supplied is determined based on at least one of the temperature, the human body detection sensor, or the use schedule. The recovery range may include, but is not limited to, a humidity less than or equal to 60% and greater than or equal to 30% and a dust concentration less than or equal to 50 μg/m3. Thus, the air conditioning control device 1000 may not recover the thermal energy of the first room when the humidity of the first room is greater than or equal to 60% or the dust concentration is greater than or equal to 50 μg/m3.

The air quality sensor may detect a pollution degree of the air in a room. The air quality sensor may include, but is not limited to, at least one of a dust sensor, a $CO_2$ sensor, a total volatile organic compound (TVOC) sensor, a temperature sensor, or a humidity sensor. The dust sensor may detect the concentration of dust in the air in a room. The $CO_2$ sensor may detect the concentration of $CO_2$ in the air in a room. The TVOC sensor may detect the concentration of harmful gases and the concentration of organic compounds in the air in a room.

The air conditioning control device 1000 according to an embodiment of the disclosure may determine a plurality of first rooms from which thermal energy is to be recovered and determine a plurality of second rooms to which thermal energy is to be supplied.

According to an embodiment of the disclosure, the air conditioning control device 1000 may determine a first room from which thermal energy is to be recovered and a second room to which thermal energy is to be supplied, based on a user input to select the first room and the second room.

In operation S320, the air conditioning control device 1000 may drive a ventilation fan to suck the air of the first room through the air outlet of the first room, to suck the air of the second room through the air outlet of the second room, to exchange thermal energy between the sucked air of the first room and the sucked air of the second room, and to discharge the air of the first room and the air of the second room where the thermal energy is exchanged to the air inlet of the first room and the air inlet of the second room.

The air conditioning control device 1000 according to an embodiment of the disclosure may mix the air of the first room sucked through the air outlet of the first room with the air of the second room sucked through the air outlet of the second room, thus exchanging thermal energy between the air of the first room and the air of the second room. In this case, the air conditioning control device 1000 may discharge the mixed air to the air inlet of the first room and the air inlet of the second room.

The air conditioning control device 1000 according to another embodiment of the disclosure may alternate the air of the first room sucked through the air outlet of the first room with the air of the second room sucked through the air outlet of the second room to avoid mixing thereof, by driving the ventilation fan, thus exchanging thermal energy between the air of the first room and the air of the second room. In this case, the air conditioning control device 1000 may discharge the heat-exchanged air of the first room to the air inlet of the first room and discharge the heat-exchanged air of the second room to the air inlet of the second room.

As thermal energy is exchanged between the air of the first room and the air of the second room, the air conditioning control device 1000 may determine whether the first room and the second room satisfy a thermal equilibrium condition. For example, the air conditioning control device 1000 may determine that the first room and the second room satisfy the thermal equilibrium condition when the temperature of the first room and the temperature of the second room become equal to each other. In another example, the air conditioning control device 1000 may determine that the first room and the second room satisfy the thermal equilibrium condition when a difference between the temperature of the first room and the temperature of the second room is within a specific temperature difference.

As the air conditioning control device 1000 determines that the first room and the second room satisfy the thermal equilibrium condition, the air conditioning control device 1000 may stop driving the ventilation fan and control an air outlet regulator and an air inlet regulator in a room to stop thermal energy exchange between the first room and the second room.

According to another embodiment of the disclosure, even when the thermal equilibrium condition is not satisfied, the air conditioning control device 1000 may stop thermal energy exchange as a specific heat exchange time is exceeded from a start time of the thermal energy exchange.

For example, the air conditioning control device 1000 may receive a user input to set an energy recovery threshold time through a user input unit (not shown), and stop driving the ventilation fan as the set energy recovery threshold time has elapsed since start of driving of the ventilation fan.

According to another embodiment of the disclosure, the air conditioning control device 1000 may identify whether a room to be supplied with thermal energy is finished being used, and stop the thermal energy exchange between rooms. For example, the air conditioning control device 1000 may stop the thermal energy exchange between rooms, when receiving a signal indicating that all users leave the room, from the human body detection sensor. In another example, the air conditioning control device 1000 may stop the thermal energy exchange between the rooms, when receiving a signal indicating that all lights are turned off, from the contact controller.

Figure 4:
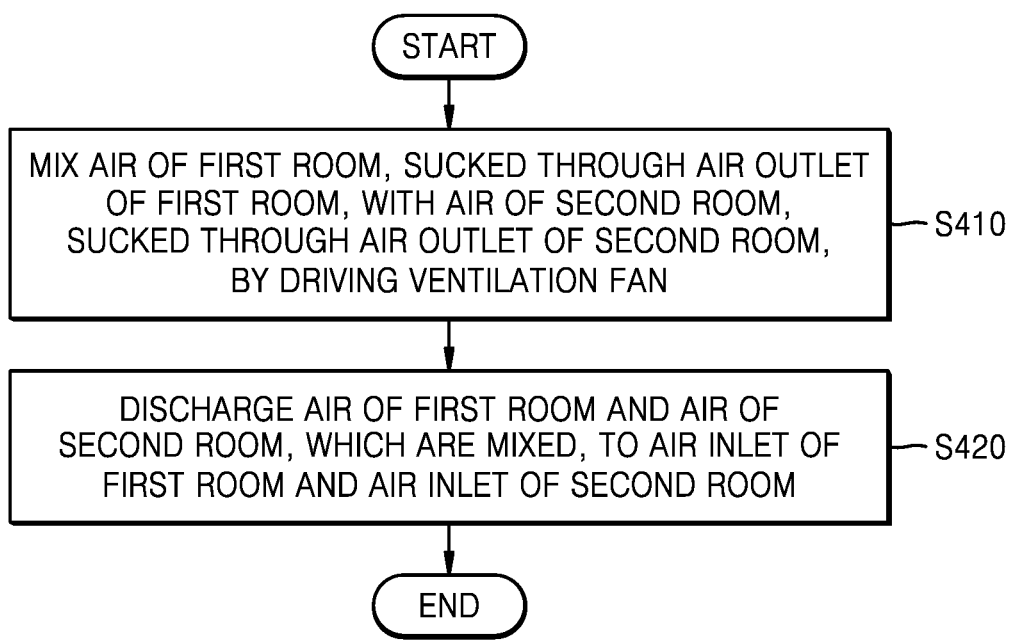
FIG. 4 is a flowchart of a method, performed by an air conditioning control device, of recovering thermal energy remaining in a room, according to an embodiment of the disclosure.

FIG. 4 is a flowchart of a method, performed by an air conditioning control device, of recovering thermal energy remaining in a room by mixing the air of rooms, according to an embodiment of the disclosure.

In operation S410, the air conditioning control device 1000 may mix the air of the first room sucked through the air outlet of the first room with the air of the second room sucked through the air outlet of the second room, by driving the ventilation fan.

In operation S420, the air conditioning control device 1000 may discharge the air of the first room and the air of the second room, which are mixed, to the air inlet of the first room and the air inlet of the second room.

As the air of the first room and the air of the second room are mixed and then circulated again in the first room and the second room, the thermal energy of the first room may be recovered to the second room.

Figure 5:
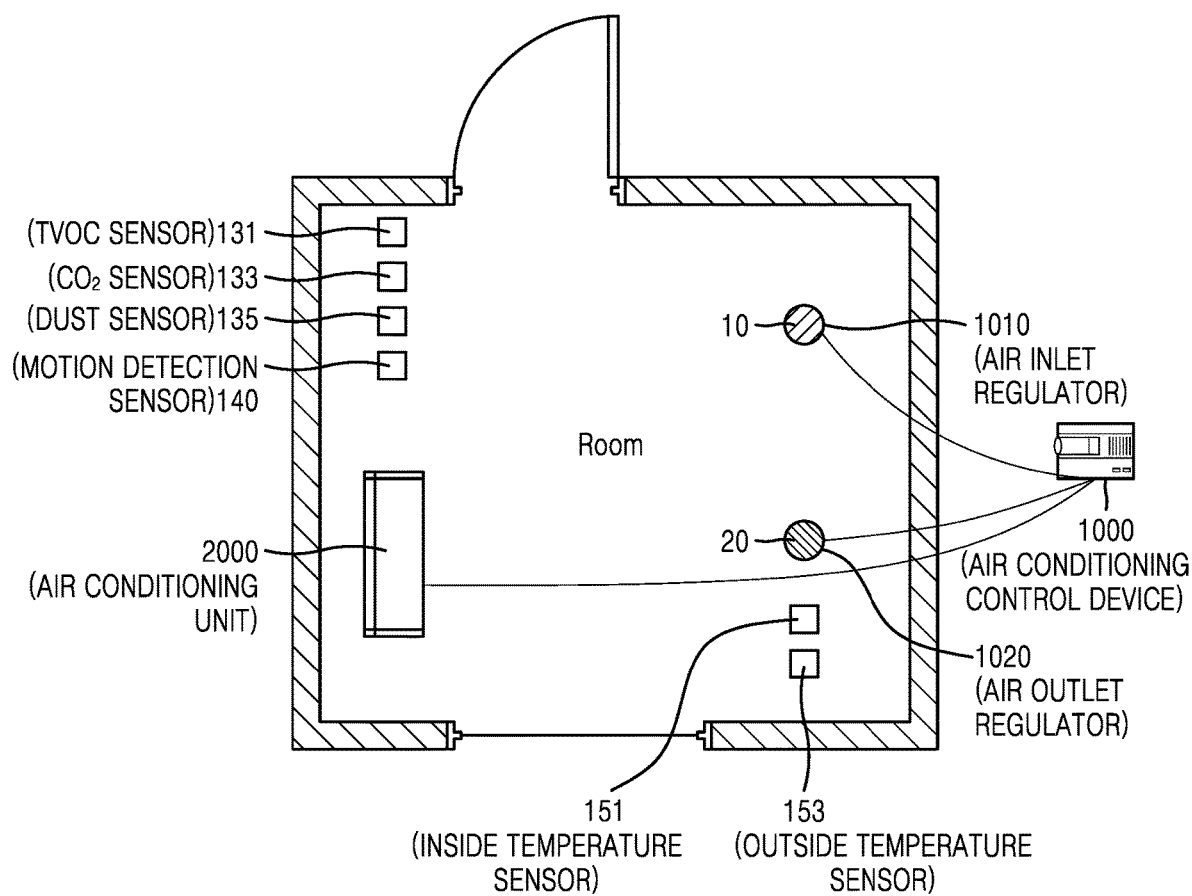
FIG. 5 illustrates an air conditioning control device and a facility in a room, according to an embodiment of the disclosure.

FIG. 5 illustrates an air conditioning control device and a facility in a room, according to an embodiment of the disclosure.

Referring to FIG. 5, a room may include an air inlet 10 and an air outlet 20. The air inlet 10 may include an air inlet regulator 1010 that may open or close the air inlet 10. The air outlet 20 may include an air outlet regulator 1020 that may open or close the air outlet 20.

The air inlet 10 and the air outlet 20 may be provided on a ceiling of a room. Furthermore, the air inlet 10 and the air outlet 20 may be arranged to be farthest from each other. For example, the air inlet 10 and the air outlet 20 may be arranged near vertices facing diagonally in a room. Thus, as the air discharged to the air inlet 10 after heat exchange is not directly sucked in the air outlet 20, efficient thermal energy exchange may be achieved between rooms.

Moreover, there may be an air quality sensor, a human body detection sensor 140, an inside temperature sensor 151, and an indoor humidity sensor 153 in a room. The air quality sensor may include a TVOC sensor 131, a $CO_2$ sensor 133, and a dust sensor 135. An air conditioning unit 2000 may be further provided in the room.

The air conditioning control device 1000 may include at least one of the air inlet regulator 1010, the air outlet regulator 1020, the human body detection sensor 140, the inside temperature sensor 151, the indoor humidity sensor 153, or the air quality sensor including the TVOC sensor 131, the $CO_2$ sensor 133, and the dust sensor 135.

The air inlet regulator 1010, the air outlet regulator 1020, the human body detection sensor 140, the inside temperature sensor 151, the indoor humidity sensor 153, and the air quality sensor including the TVOC sensor 131, the $CO_2$ sensor 133, and the dust sensor 135 may be connected with the air conditioning control device 1000 in a wired manner or in a short-range wireless communication manner. For example, the air inlet regulator 1010, the air outlet regulator 1020, and the air conditioning unit 2000 may be controlled by being connected to the air conditioning control device 1000 by wire, and the other sensors may be controlled by being wirelessly connected to the air conditioning control device 1000.

Figure 6A:
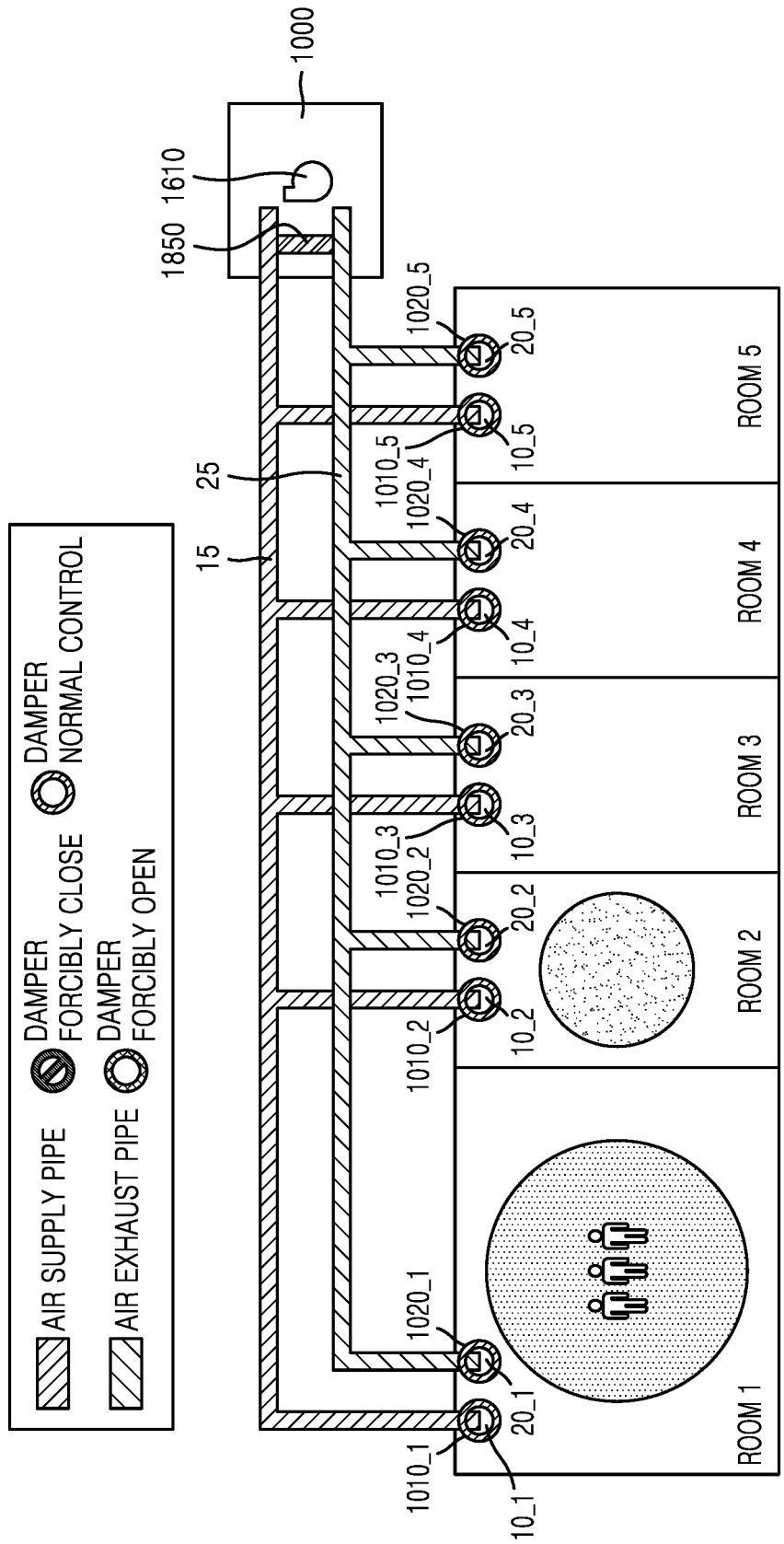
Figure 6B:
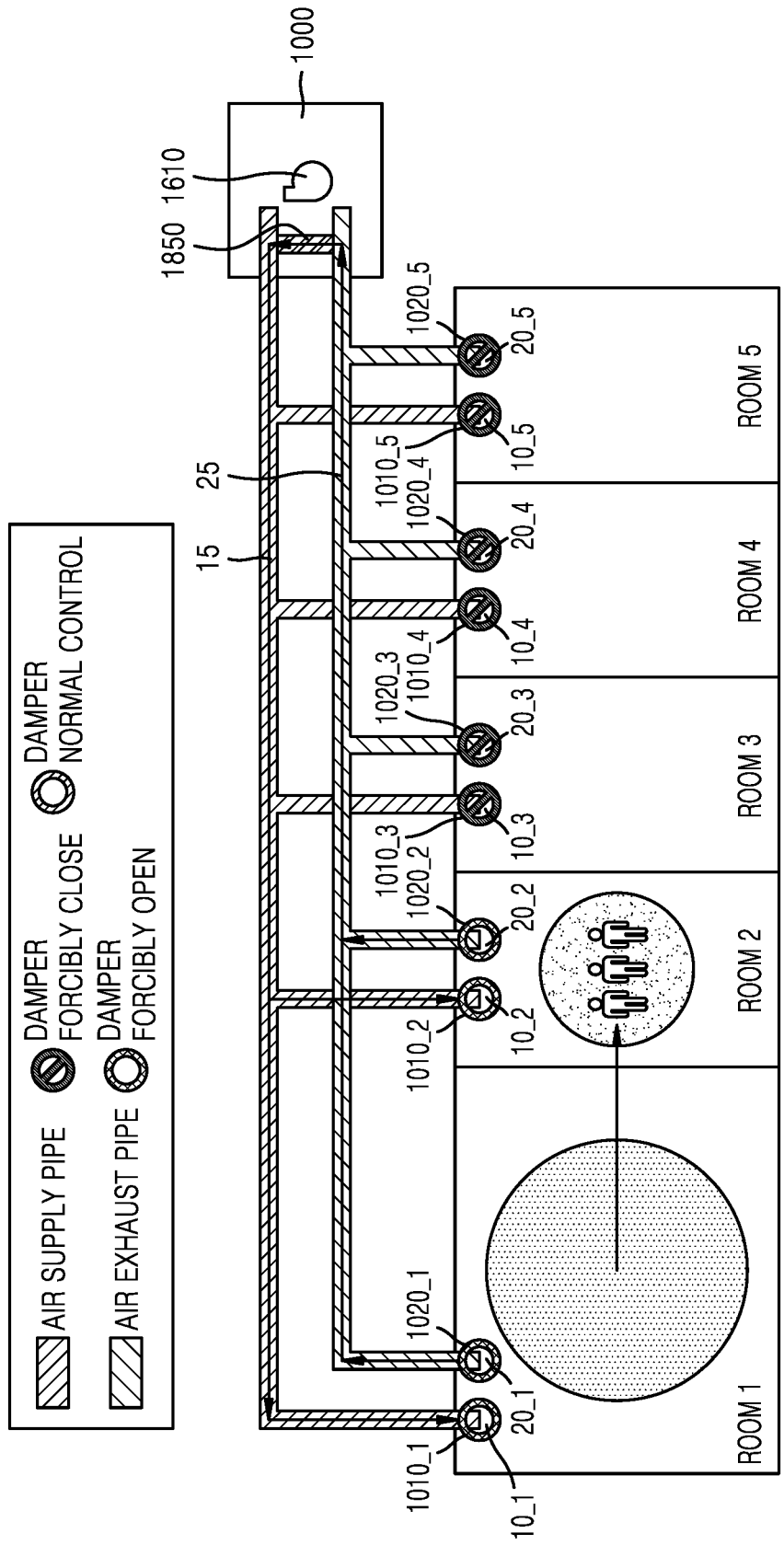

FIGS. 6A through 6C illustrate a method, performed by an air conditioning control device, of recovering thermal energy in a room by mixing the air of rooms, according to an embodiment of the disclosure.

Referring to FIG. 6A, in a normal control mode, the air conditioning control device 1000 may close the air inlets 10_1 to 10_5 and the air outlets 20_1 to 20_5 or suck the outside air into the room by using the ventilation fan after opening the air inlets 10_1 to 10_5 and the air outlets 20_1 to 20_5. The normal control mode may mean when the air conditioning control device 1000 does not recover thermal energy in the room.

In the normal control mode, when external ventilation is selected by the user, the air conditioning control device 1000 may control air inlet regulators 1010_1 to 1010_5 and outlet regulators 1020_1 to 1020_5 to open the air inlets 10_1 to 10_5 and the air outlets 20_1 to 20_5, and drive a ventilation fan 1610 when closing a circulation connection unit 1850.

As shown in FIG. 6A, the air inlets 10_1 to 10_5 in the room may be connected to an air supply pipe 15 and the air outlets 20_1 to 20_5 in the room may be connected to an air exhaust pipe 25. As the ventilation fan 1610 is driven, the volumes of air in the room may be sucked through the air outlets 20_1 to 20_5 and discharged to the outside through the air exhaust pipe 25, and the outside air may be discharged to the room via the air inlets 10_1 to 10_5 through the air supply pipe 15.

In the normal control mode, when external ventilation is not selected by the user, the air conditioning control device 1000 may control air inlet regulators 1010_1 to 1010_5 and outlet regulators 1020_1 to 1020_5 to close the air inlets 10_1 to 10_5 and the air outlets 20_1 to 20_5.

As shown in FIG. 6A, users are using Room 1 that may be cooled by an air conditioning unit. Accordingly, cold energy may be accumulated in Room 1.

Referring to FIG. 6B, the air conditioning control device 1000 may recover a part of the cold energy remaining in Room 1 to Room 2.

As users in Room 1 leave Room 1, the air conditioning control device 1000 may determine that the use of Room 1 is finished, based on the human body detection sensor. As the same user or another user enters Room 2, the air conditioning control device 1000 may determine that the use of Room 2 begins.

When determining that the use of Room 2 begins, the air conditioning control device 1000 may determine, based on the temperature of Room 2, whether Room 2 requires thermal energy, and, when determining that Room 2 requires thermal energy, may determine Room 1 as the first room from which thermal energy is to be recovered and Room 2 as the second room to which thermal energy is to be supplied.

When determining to recover cold energy from the first room and supply the cold energy to the second room, the air conditioning control device 1000 may control the air inlet regulators 1010_1 and 1010_2 and the air outlet regulators 1020_1 and 1020_2 of the first room and the second room to open the air inlet regulators 1010_1 and 1010_2 and the air outlet regulators 1020_1 and 1020_2 of the first room and the second room, and control the air inlet regulators 1010_3 to 1010_5 and the air outlet regulators 1020_3 to 1020_5 of the other rooms than the first room and the second room to close the air inlets 10_3 to 10_5 and the air outlets 20_3 to 20_5.

The air conditioning control device 1000 may connect the air supply pipe 15 to the air exhaust pipe 25 by opening the circulation connection unit 1850 connected to the air supply pipe 15 and the air exhaust pipe 25. The air conditioning control device 1000 may drive the ventilation fan 1610.

As the ventilation fan 1610 is driven, the air of the first room may be sucked through the air outlet 20_1 of the first room and the air of the second room may be sucked through the air outlet 20_2 of the second room, and the sucked volumes of air may be mixed and discharged to the air inlets 10_1 and 10_2 of the first room and the second room through the air exhaust pipe 25, the circulation connection unit 1850, and the air supply pipe 15, thus forming a closed loop connecting the first room to the second room. As the air of the first room and the air of the second room are mixed, cold energy in the air of the first room and thermal energy in the air of the second room are exchanged, such that a part of the cold energy of the first room may be recovered to the second room.

Referring to FIG. 6C, the air conditioning control device 1000 may stop driving the ventilation fan 1610 when the first room and the second room enter the thermal equilibrium state.

The air conditioning control device 1000 may determine, based on the temperature of the first room and the temperature of the second room, whether thermal equilibrium is achieved between the first room and the second room. For example, the air conditioning control device 1000 may determine that thermal equilibrium is achieved between the first room and the second room, when the temperature of the first room and the temperature of the second room become equal to each other.

When determining that thermal equilibrium is achieved between the first room and the second room, the air conditioning control device 1000 may stop driving the ventilation fan 1610. The air conditioning control device 1000 may control the air outlet regulators 1020_1 and 1020_2 and the air inlet regulators 1010_1 and 1010_2 of the first room and the second room to close the air outlets 20_1 and 20_2 and the air inlets 10_1 and 10_2 of the first room and the second room. When a ventilation mode is set, the air conditioning control device 1000 may open the air outlets 20_1 to 20_5 and the air inlets 10_1 to 10_5 of respective rooms and close the ventilation connection unit 1850, and then drive the ventilation fan 1610 to replace the air in the room with the outside air.

According to an embodiment of the disclosure, when driving of the air conditioning unit is set in the second room, as a closed loop connecting the first room to the second room is released by stopping driving the ventilation fan 1610 without driving the air conditioning unit in thermal energy exchange, the air conditioning control device 1000 may control the air conditioning unit positioned in the second room to start cooling of the second room.

Figure 7:
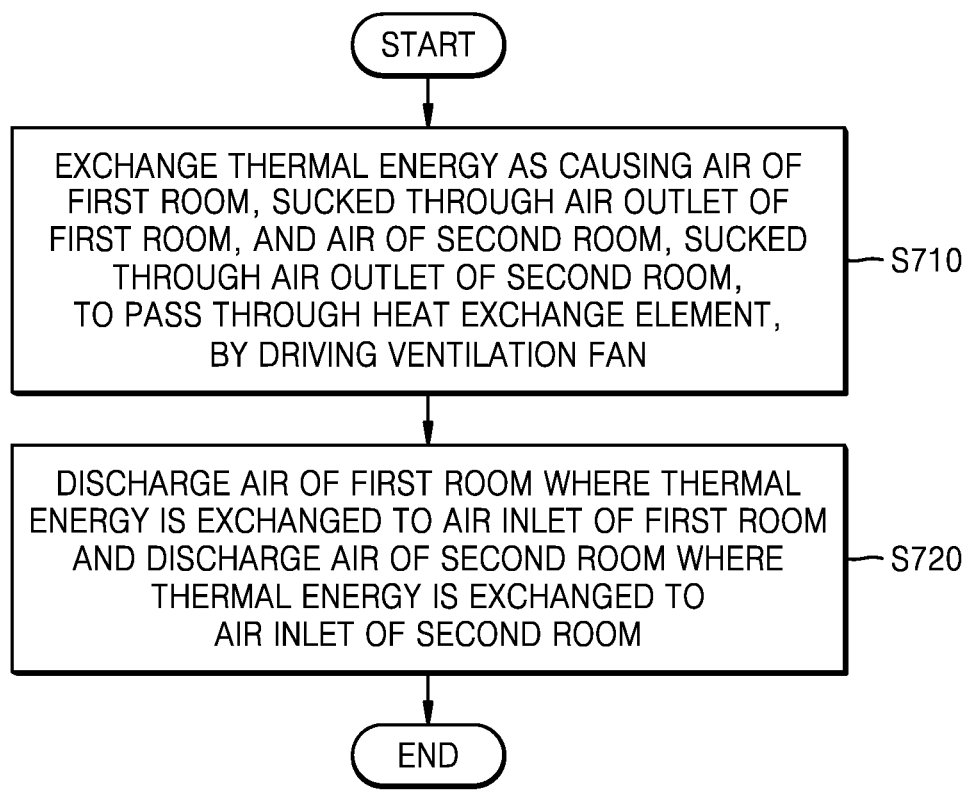
FIG. 7 is a flowchart of a method, performed by an air conditioning control device, of recovering thermal energy remaining in a room, according to an embodiment of the disclosure.

FIG. 7 is a flowchart of a method, performed by an air conditioning control device, of recovering thermal energy remaining in a room using a heat exchange element, according to an embodiment of the disclosure.

In operation S710, the air conditioning control device 1000 may exchange thermal energy as causing the air of the first room sucked through the air outlet of the first room and the air of the second room sucked through the air outlet of the second room to pass through the heat exchange element, by driving the ventilation fan.

The heat exchange element may exchange thermal energy of the two volumes of air supplied to the heat exchange element. A route through which the air of the first room passes and a route through which the air of the second room passes are different from each other in the heat exchange element, such that thermal energy exchange may be made without mixing the air of the first room with the air of the second room.

In operation S720, the air conditioning control device 1000 may discharge the heat-exchanged air of the first room to the air inlet of the first room and discharge the heat-exchanged air of the second room to the air inlet of the second room.

As thermal energy is exchanged between the air of the first room and the air of the second room, the first room and the second room may reach the thermal equilibrium state.

Figure 8:
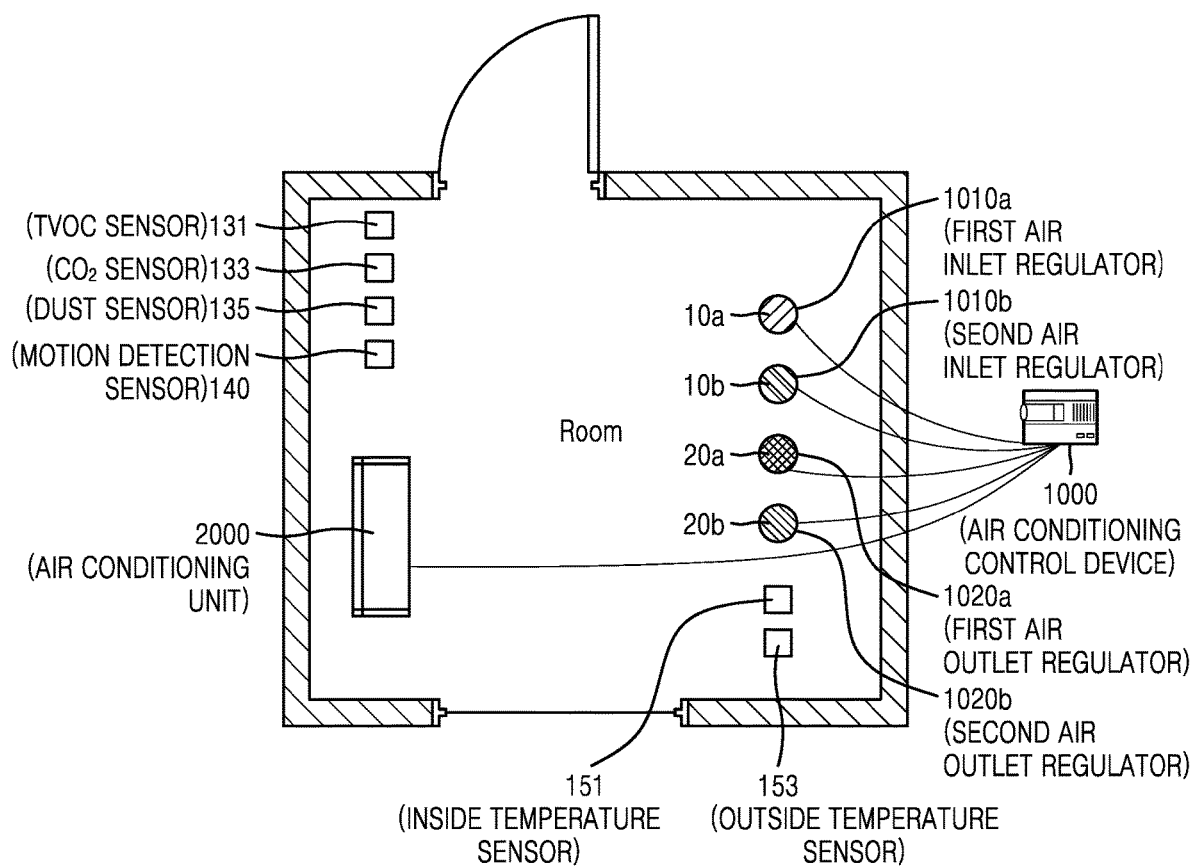
FIG. 8 illustrates an air conditioning control device and a facility in a room, according to another embodiment of the disclosure.

FIG. 8 illustrates an air conditioning control device and a facility in a room, according to another embodiment of the disclosure.

Referring to FIG. 8, a room shown in FIG. 8 may further include a pair of a heat recovery air inlet 10*b* and a heat recovery air outlet 20*b* in addition to the device and the facilities shown in FIG. 5. Thus, the room may include a first air inlet 10*a*, a second air inlet 10*b*, a first air outlet 20*a*, and a second air outlet 20*b*. The air conditioning control device 1000 may close or open the first air inlet 10*a*, the second air inlet 10*b*, the first air outlet 20*a*, and the second air outlet 20*b* by regulating a first air inlet regulator 1010*a*, a second air inlet regulator 1010*b*, a first air outlet regulator 1020*a*, and a second air outlet regulator 1020*b*.

The first air inlet 10*a* and the second air inlet 10*b* may be arranged to be farthest from the first air outlet 20*a* and the second air outlet 20*b*. For example, the first and second air inlets 10*a* and 10*b* and the first and second air outlets 20*a* and 20*b* may be arranged around diagonally facing vertices.

Thus, in another example, the first air inlet 10*a*, the second air inlet 10*b*, the first air outlet 20*a*, and the second air outlet 20*b* may be respectively arranged at respective vertices of the room.

Figure 9A:
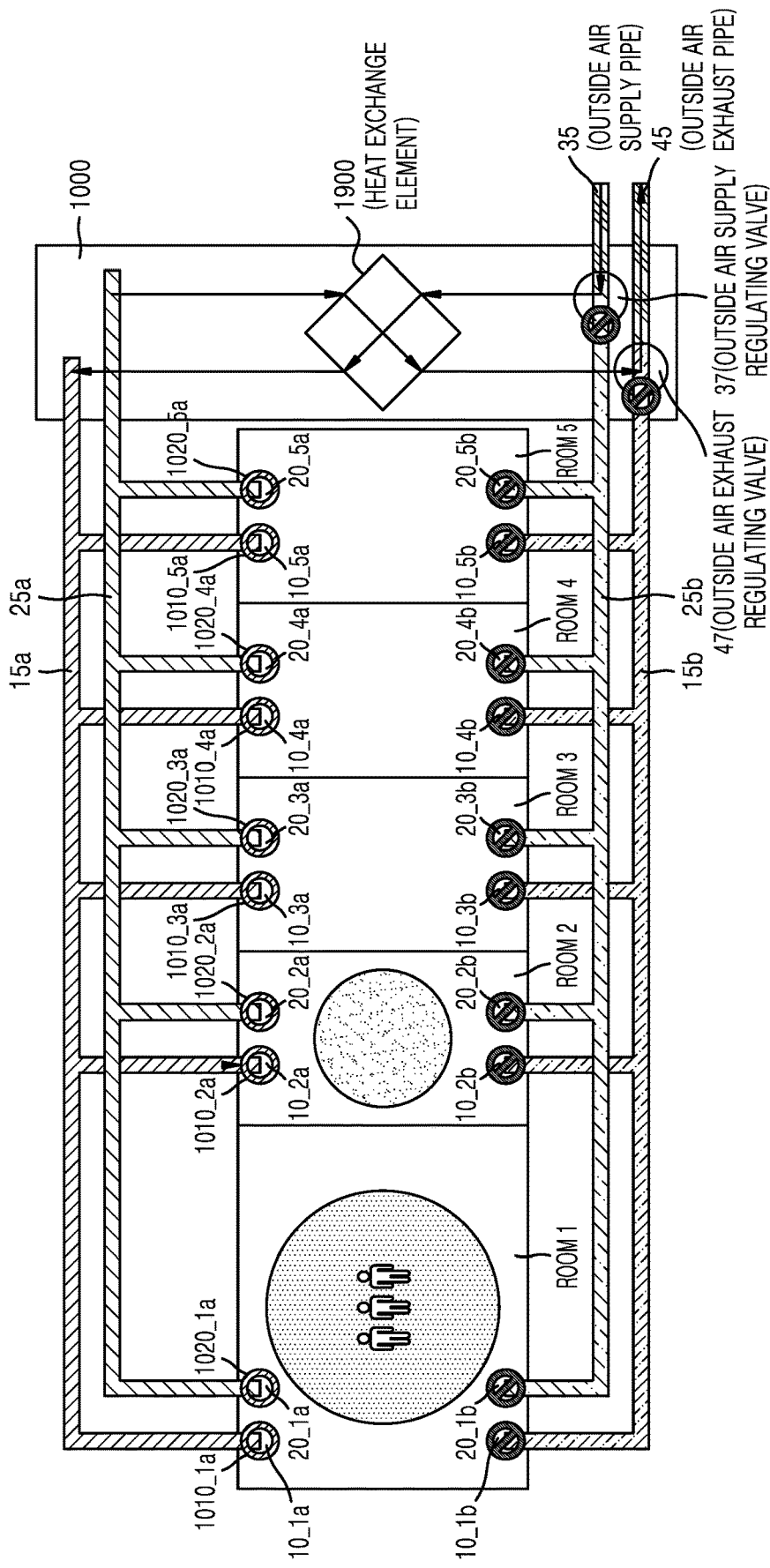
FIG. 9A illustrates a method, performed by an air conditioning control device, of ventilating a room by using a heat exchange element in an outside air circulation mode, according to another embodiment of the disclosure.

FIG. 9A illustrates a method, performed by an air conditioning control device, of ventilating a room by using a heat exchange element in an outside air circulation mode, according to another embodiment of the disclosure.

Referring to FIG. 9A, in the outside air circulation mode, the air conditioning control device 1000 may discharge the inside air and supply the outside air to each room.

A plurality of rooms may respectively include first air inlets 10_1*a*, 10_2*a*, 10_3*a*, 10_4*a*, and 10_5*a*, second air inlets 10_1*b*, 10_2*b*, 10_3*b*, 10_4*b*, and 10_5*b*, first air outlets 20_1*a*, 20_2*a*, 20_3*a*, 20_4*a*, and 20_5*a*, and second air outlets 20_1*b*, 20_2*b*, 20_3*b*, 20_4*b*, and 20_5*b*. The first air inlets 10_1*a*, 10_2*a*, 10_3*a*, 10_4*a*, and 10_5*a* of the respective rooms may be connected to a first air supply pipe 15*a*, and the second air inlets 10_1*b*, 10_2*b*, 10_3*b*, 10_4*b*, and 10_5*b* of the respective rooms may be connected to a second air supply pipe 15*b*. The first air outlets 20_1*a*, 20_2*a*, 20_3*a*, 20_4*a*, and 20_5*a* of the respective rooms may be connected to a first air exhaust pipe 25*a*, and the second air outlets 20_1*b*, 20_2*b*, 20_3*b*, 20_4*b*, and 20_5*b* of the respective rooms may be connected to a second air exhaust pipe 25*b*.

According to an embodiment of the disclosure, the second air inlets 10_1*b*, 10_2*b*, 10_3*b*, 10_4*b*, and 10_5*b* may be referred to as heat recovery air inlets, and the second air outlets 20_1*b*, 20_2*b*, 20_3*b*, 20_4*b*, and 20_5*b* may be referred to as heat recovery air outlets.

The second air supply pipe 15*b* may be connected to an outside air exhaust pipe 45 or a heat exchange element 1900 or may be closed, by an outside air exhaust regulating valve 47. The second air exhaust pipe 25*b* may be connected to an outside air supply pipe 35 or the heat exchange element 1900 or may be closed, by an outside air supply regulating valve 37.

In the outside air circulation mode, the air conditioning control device 1000 may close the second air inlets 10_1*b*, 10_2*b*, 10_3*b*, 10_4*b*, and 10_5*b* and the second air outlets 20_1*b*, 20_2*b*, 20_3*b*, 20_4*b*, and 20_5*b*, which are heat recovery facilities, and open the first air inlets 10_1*a*, 10_2*a*, 10_3*a*, 10_4*a*, and 10_5*a* and the first air outlets 20_1*a*, 20_2*a*, 20_3*a*, 20_4*a*, and 20_5*a*. The air conditioning control device 1000 may control the outside air supply regulating valve 37 to close the second air exhaust pipe 25*b* and connect the outside air supply pipe 35 to the heat exchange element 1900. The air conditioning control device 1000 may control the outside air supply regulating valve 47 to close the second air supply pipe 15*b* and connect the outside air exhaust pipe 45 to the heat exchange element. The air conditioning control device 1000 may drive a ventilation fan (not shown) in the air conditioning control device 1000.

When the ventilation fan (not shown) is driven, the volumes of air in the respective rooms may be discharged through the outside air exhaust pipe 45 via the first air outlets 20_1*a*, 20_2*a*, 20_3*a*, 20_4*a*, and 20_5*a*, the first air exhaust pipe 25*a*, and the heat exchange element 1900, and the outside air may be discharged to the first air inlets 10_1*a*, 10_2*a*, 10_3*a*, 10_4*a*, and 10_5*a* through the outside air supply pipe 35 via the heat exchange element 1900 and the first air supply pipe 15*a*. Thus, in the outside air circulation mode, the air conditioning control device 1000 may discharge the inside air and supply the outside air to each room. The air conditioning control device 1000 may recover a part of thermal energy in a room through the heat exchange element even discharging the inside air.

Figure 9B:
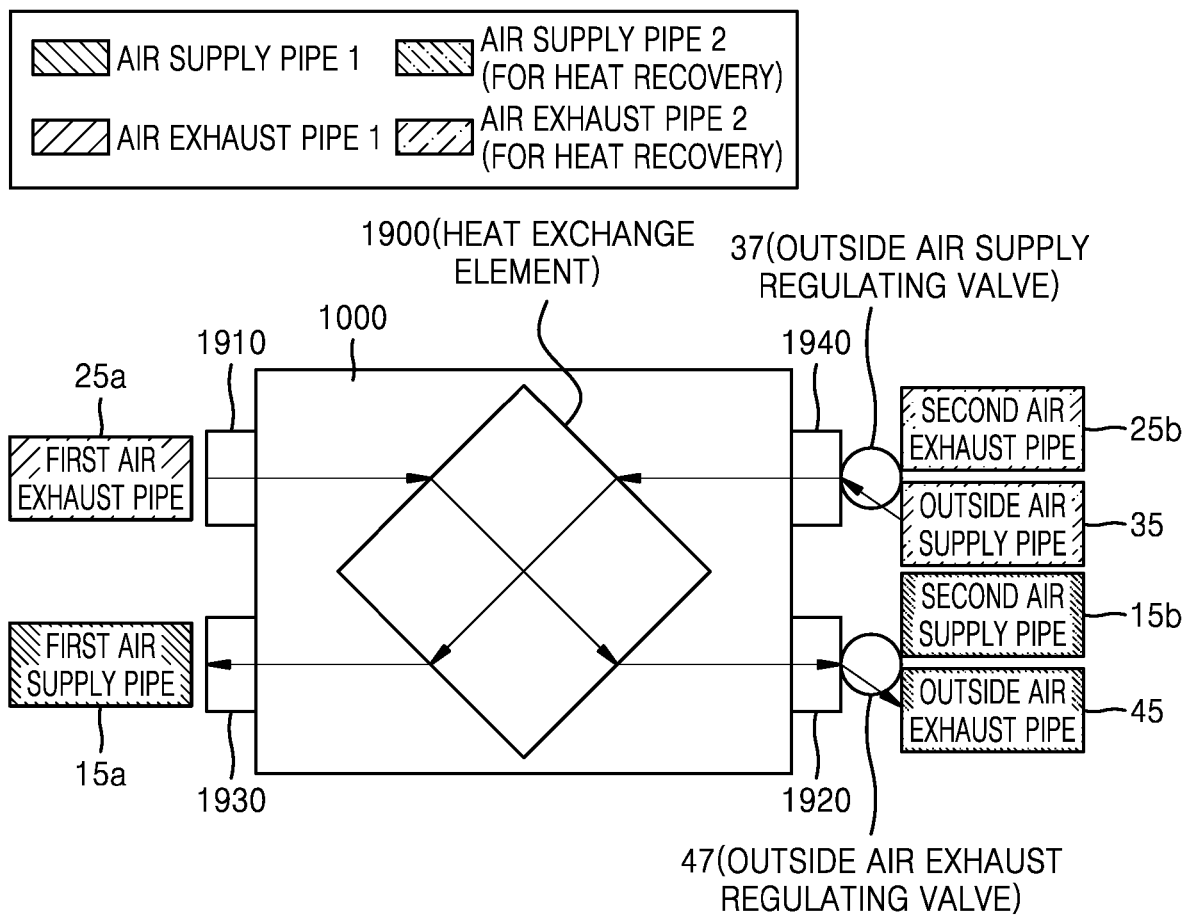
FIG. 9B illustrates a flow of the air in an air conditioning control device in an outside air circulation mode, according to an embodiment of the disclosure.

FIG. 9B illustrates a flow of the air in an air conditioning control device in an outside air circulation mode, according to an embodiment of the disclosure.

Referring to FIG. 9B, in the outside air circulation mode, the air conditioning control device 1000 may control the outside air supply regulating valve 37 and the outside air exhaust regulating valve 47 to discharge the inside air and supply the outside air to a room.

The air conditioning control device 1000 may include first to fourth pipe connection units 1910 to 1940. The first pipe connection unit 1910 may be connected to the second pipe connection unit 1920 through the heat exchange element 1900, and the third pipe connection unit 1930 may be connected to the fourth pipe connection unit 1940 through the heat exchange element 1900.

The first pipe connection unit 1910 may be connected to the first air exhaust pipe 25*a*. The second pipe connection unit 1920 may be connected to the second air supply pipe 15*b* or the outside air exhaust pipe 45 by the outside air exhaust regulating valve 47. The third pipe connection unit 1930 may be connected to the first air supply pipe 15*a*, and the fourth pipe connection unit 1940 may be connected to the second air exhaust pipe 25*b* or the outside air supply pipe 35 by the outside air supply regulating valve 37.

The air conditioning control device 1000 may include a first ventilation fan (not shown) and a second ventilation fan (not shown).

In the outside air circulation mode, the air conditioning control device 1000 may control the outside air exhaust regulating valve 47 to connect the outside air exhaust pipe 45 to the second pipe connection unit 1920. Thus, the first air exhaust pipe 25*a* connected to the first pipe connection unit 1910 may be connected to the outside air exhaust pipe 45 connected to the second pipe connection unit 1920 via the heat exchange element 1900. The air conditioning control device 1000 may also control the outside air supply regulating valve 37 to connect the outside air supply pipe 35 to the fourth pipe connection unit 1940. Thus, the first air supply pipe 15*a* connected to the third pipe connection unit 1930 may be connected to the outside air supply pipe 35 connected to the fourth pipe connection unit 1940 via the heat exchange element 1900.

When the first ventilation fan (not shown) is driven, the air of the first room, sucked from the first air exhaust pipe 25*a*, may be discharged to the outside via the heat exchange element 1900 and the outside air exhaust pipe 45. When the second ventilation fan (not shown) is driven, the outside air sucked from the outside air supply pipe 35 may be discharged to the first room via the heat exchange element 1900 and the first air supply pipe 15*a*.

Thus, in the outside air circulation mode, the air in the room may be exchanged with the outside air.

Figure 10A:
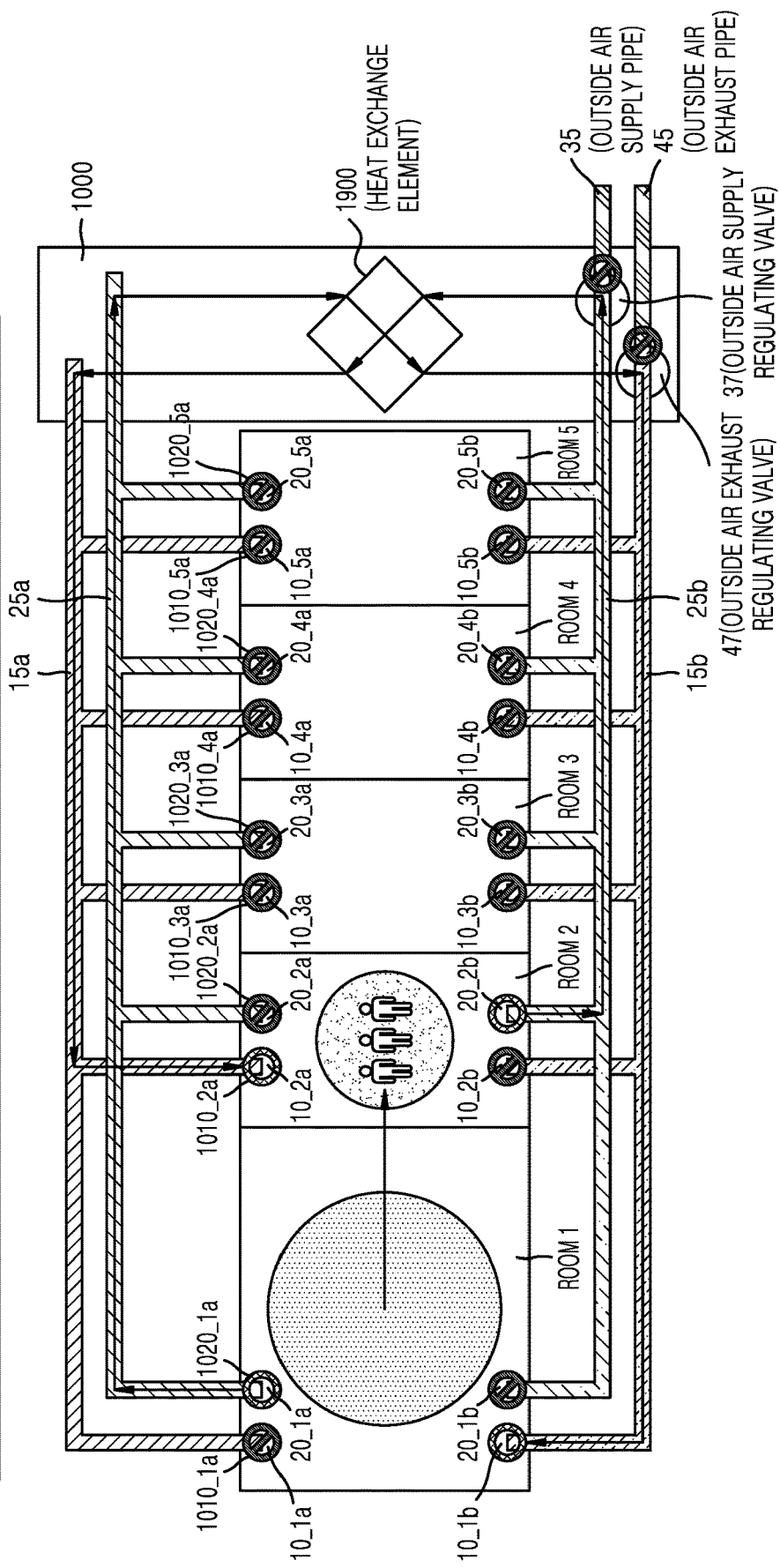
FIG. 10A illustrates a method, performed by an air conditioning control device, of recovering thermal energy remaining in a room to another room by using a heat exchange element in a total heat recovery mode, according to another embodiment of the disclosure.

FIG. 10A illustrates a method, performed by an air conditioning control device, of recovering thermal energy remaining in a room to another room by using a heat exchange element in a total heat recovery mode, according to another embodiment of the disclosure.

Referring to FIG. 10A, in the total heat recovery mode, the air conditioning control device 1000 may perform heat exchange between the air of the first room from which thermal energy is to be recovered and the air of the second room to which thermal energy is to be supplied, through the heat exchange element 1900.

The air conditioning control device 1000 may determine Room 1 as the first room from which thermal energy is to be recovered, and determine Room 2 as the second room to which the thermal energy to be recovered is to be supplied.

In the total heat recovery mode, the air conditioning control device 1000 may close the air outlets 20_3*a* to 20_5*b* and 20_3*b* to 20_5*b* and the air inlets 10_3*a* to 10_5*b* and 10_3*b* to 10_5*b* of the other rooms than the first room and the second room.

In the total heat recovery mode, the air conditioning control device 1000 may open the first air outlet 20_1*a* of the first room and the second air inlet 10_1*b* of the first room, close the first air inlet 10_1*a* of the first room and the second air outlet 20_1*b* of the first room, and control the outside air exhaust regulating valve 47 to connect the first air exhaust pipe 25*a* to the second air supply pipe 15*b* through the heat exchange element 1900. When the air conditioning control device 1000 drives the first ventilation fan (not shown), a close loop may be formed such that the air of the first room is discharged back to the second air inlet 10_1*b* of the first room via the first air outlet 20_1*a* of the first room and the heat exchange element 1900.

The air conditioning control device 1000 may also open the first air inlet 10_2*a* of the second room and the second air outlet 20_2*b* of the second room, close the first air outlet 20_2*a* of the second room and the second air inlet 10_2*b* of the second room, and control the outside air supply regulating valve 37 to connect the second air exhaust pipe 25*b* to the first air supply pipe 15*a* through the heat exchange element 1900. When the air conditioning control device 1000 drives the second ventilation fan (not shown), a close loop may be formed such that the air of the second room is discharged back to the first air inlet 10_2*a* of the second room via the second air outlet 20_2*b* of the second room and the heat exchange element 1900.

The air of the first room and the air of the second room may not be mixed with each other in the heat exchange element, and thermal energy of the two volumes of air may be merely exchanged. Thus, the thermal energy of the first room may be recovered to the second room without mixing the volumes of air, such that even the poor air quality of the first room may not affect the air of the second room. The air conditioning control device 1000 may perform individual cooling and heating on the second room, together with heat exchange between the first room and the second room.

The air conditioning control device 1000 according to another embodiment of the disclosure may perform air conditioning and ventilation at the same time by introducing the outside air, together with heat exchange between rooms. For example, to perform ventilation of the second room in addition to supplying thermal energy of the first room to the second room, the air conditioning control device 1000 may control the outside air supply regulating valve 37 to connect the heat recovery air exhaust pipe 25*b* to the outside air supply pipe 35 as well as to the heat exchange element 1900. When the air conditioning control device 1000 drives the second ventilation fan (not shown), the air of the second room, sucked from the heat recovery air outlet 20_2*b*, may be mixed with the outside air sucked from the outside air supply pipe 35 and discharged to the air inlet 10_2*a* of the second room via the heat exchange element 1900. Thus, for the second room, ventilation as well as heat recovery from another room may be performed at the same time.

Figure 10B:
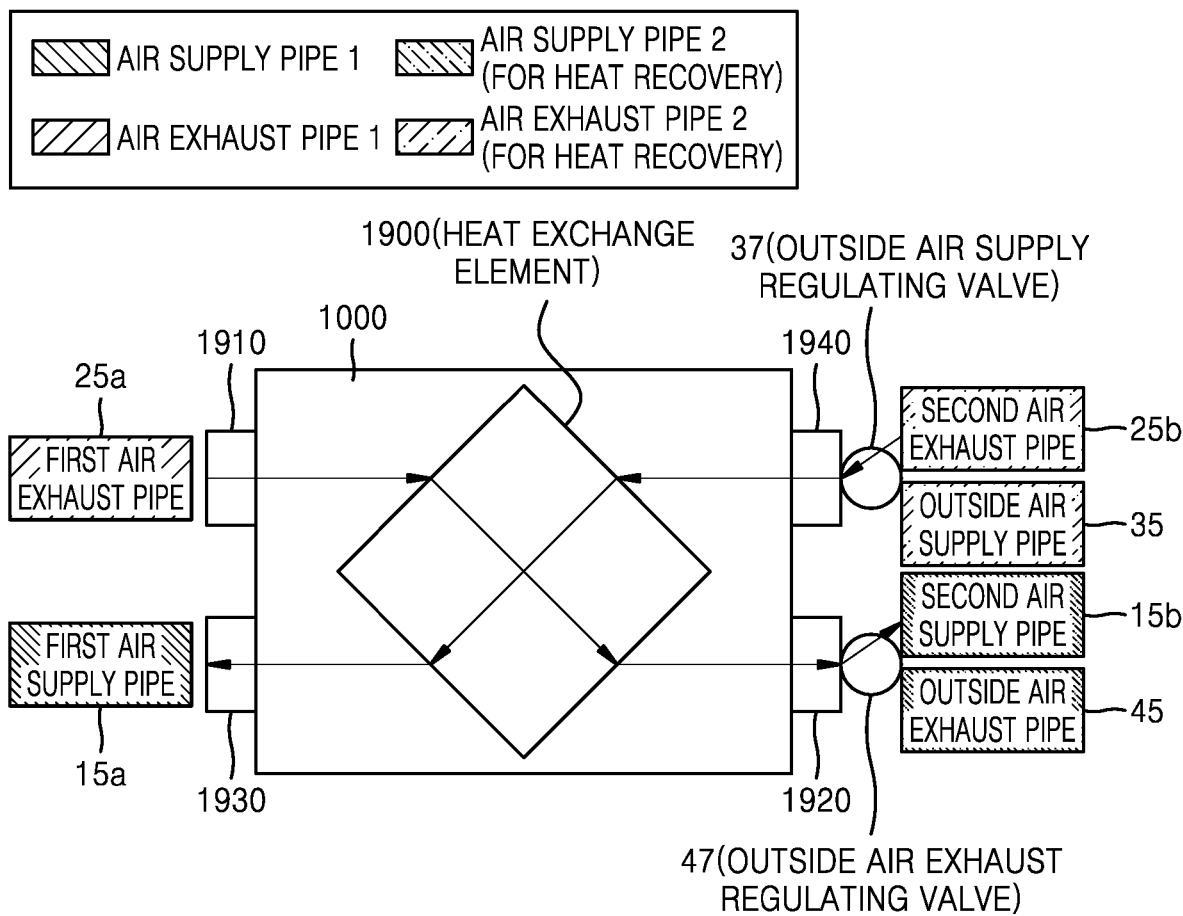
FIG. 10B illustrates a flow of the air in an air conditioning control device in a total heat recovery mode, according to an embodiment of the disclosure.

FIG. 10B illustrates a flow of the air in an air conditioning control device in a total heat recovery mode, according to an embodiment of the disclosure.

Referring to FIG. 10B, in the total heat recovery mode, the air conditioning control device 1000 may control the outside air supply regulating valve 37 and the outside air exhaust regulating valve 47 to supply thermal energy remaining in the first room to the second room.

In the total heat recovery mode, the air conditioning control device 1000 may control the outside air exhaust regulating valve 47 to connect the second air supply pipe 15*b* to the second pipe connection unit 1920. Thus, the first air exhaust pipe 25*a* connected to the first pipe connection unit 1910 may be connected to the second air supply pipe 15*b* connected to the second pipe connection unit 1920 via the heat exchange element 1900. The air conditioning control device 1000 may also control the outside air supply regulating valve 37 to connect the second air exhaust pipe 25*b* to the fourth pipe connection unit 1940. Thus, the first air supply pipe 15*a* connected to the third pipe connection unit 1930 may be connected to the second air exhaust pipe 25*b* connected to the fourth pipe connection unit 1940 via the heat exchange element 1900.

When the first ventilation fan is driven, the air of the first room, sucked through the first air exhaust pipe 25*a*, may be discharged back to the first room via the heat exchange element 1900 and the second air supply pipe 15*b*. When the second ventilation fan is driven, the air of the second room, sucked through the second air exhaust pipe 25*b*, may be discharged back to the second room via the heat exchange element 1900 and the first air supply pipe 15*a*. Thus, heat exchange may be made in the heat exchange element without mixing the air of the first room with the air of the second room.

Figure 11A:
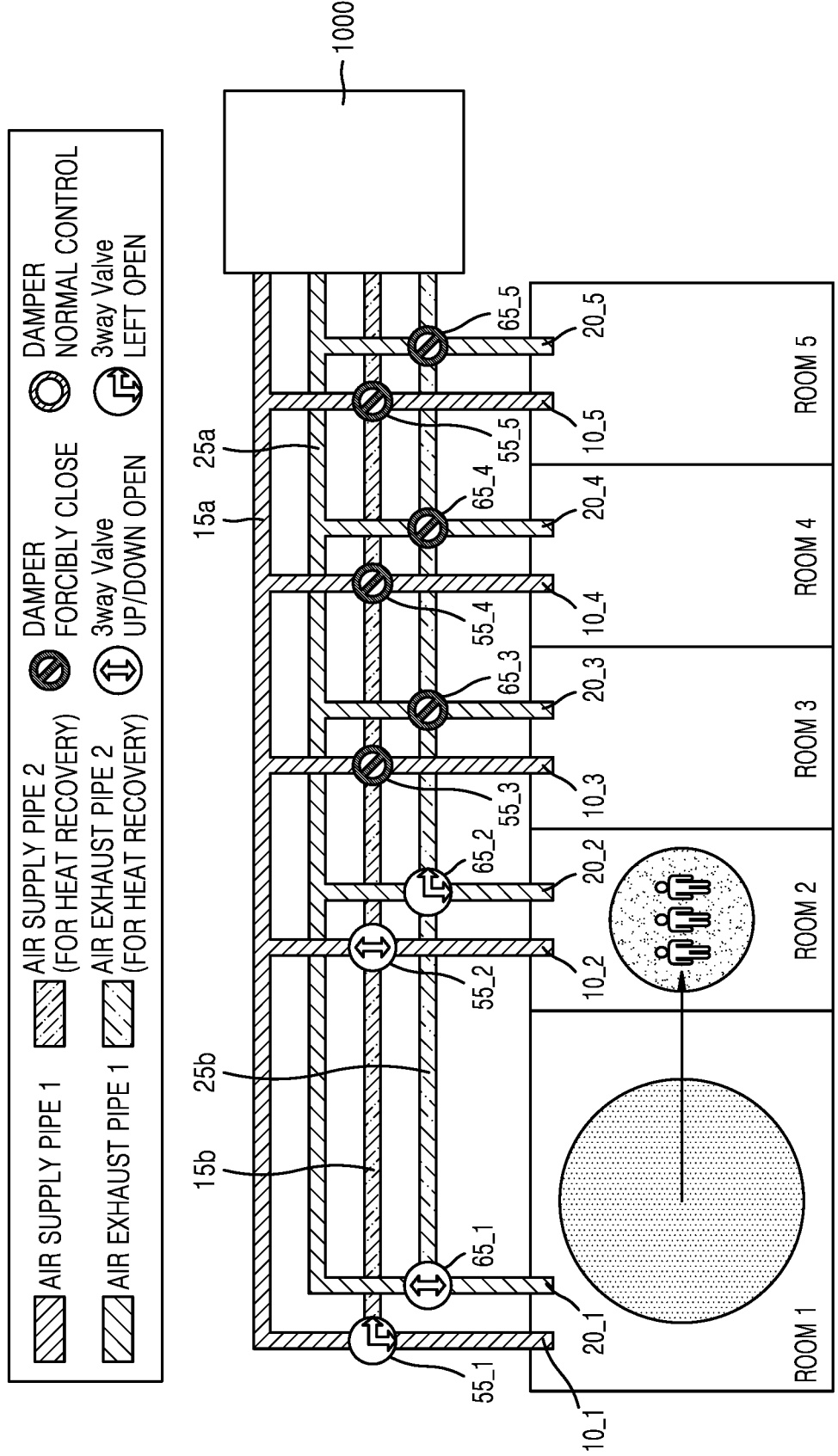
FIGS. 11A and 11B are flowcharts of a method, performed by an air conditioning control device, of recovering thermal energy remaining in a room by controlling a pipeline control unit, according to another embodiment of the disclosure.
Figure 11B:
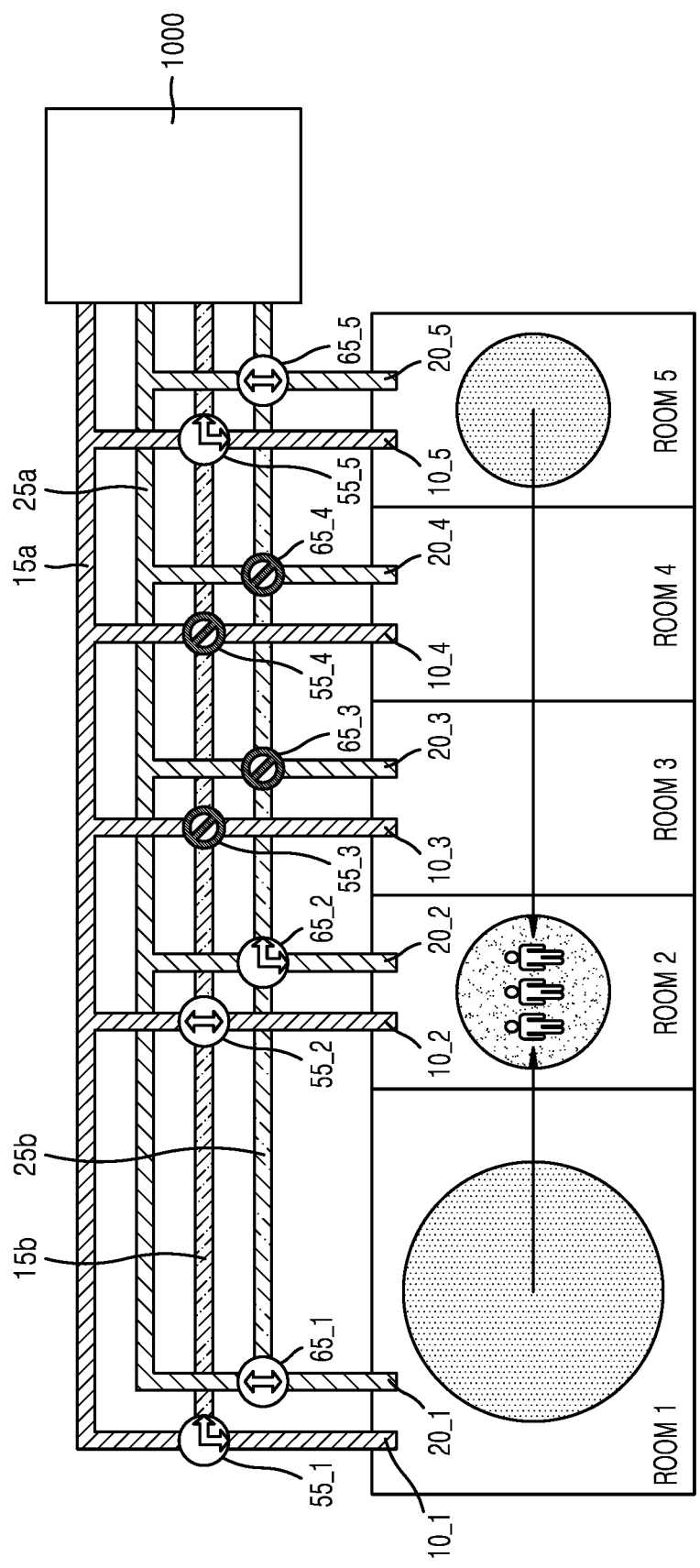

FIGS. 11A and 11B are flowcharts of a method, performed by an air conditioning control device, of recovering thermal energy remaining in a room by controlling a pipeline control unit, according to another embodiment of the disclosure.

Referring to FIG. 11A, the air conditioning control device 1000 may enable exchange of thermal energy without mixing the air of the first room with the air of the second room, even when each room includes a pair of an air outlet and an air inlet.

The air conditioning control device 1000 may determine Room 1 as the first room from which thermal energy is to be recovered, and determine Room 2 as the second room to which the thermal energy to be recovered is to be supplied.

The plurality of air outlets 20_1 to 20_5 may be connected to the first air exhaust pipe 25*a* or the second air exhaust pipe 25*b* for heat recovery through air exhaust pipeline control units 65_1, 65_2, 65_3, 65_4, and 65_5. The plurality of air inlets 10_1 to 10_5 may be connected to the first air supply pipe 15*a* or the second air supply pipe 15*b* for heat recovery through air supply pipeline control units 55_1, 55_2, 55_3, 55_4, and 55_5.

The air conditioning control device 1000 may be described with reference to a structure of the air conditioning control device 1000 shown in FIG. 10B. For example, in the air conditioning control device 1000, the first air exhaust pipe 25*a* may be connected to the second air supply pipe 15*b* via the heat exchange element 1900, and the first air supply pipe 15*a* may be connected to the second air exhaust pipe 25*b* via the heat exchange element 1900.

The air conditioning control device 1000 may control the air supply pipeline control units 65_3, 65_4, and 65_5 and the air exhaust pipeline control units 55_3, 55_4, and 55_5 of the other rooms to close the air outlets 20_3 to 20_5 and the air inlets 10_3 to 10_5 of the other rooms.

The air conditioning control device 1000 may drive the first ventilation fan, control the air exhaust pipeline control unit 65_1 of the first room to introduce the air of the first room, sucked through the air outlet 20_1 of the first room, to the first air exhaust pipe 25*a*, control the air supply pipeline control unit 55_1 of the first room to induce the air of the first room, introduced to the first air exhaust pipe 25*a* and introduced to the second air supply pipe 15*b* via the heat exchange element 1900, to the air inlet 10_1 of the first room.

The air conditioning control device 1000 may also drive the second ventilation fan, control the air exhaust pipeline control unit 65_2 of the second room to introduce the air of the second room, sucked through the air outlet 20_2 of the second room, to the second air exhaust pipe 25*b*, control the air supply pipeline control unit 55_2 of the second room to introduce the air of the second room, introduced to the second air exhaust pipe 25*b* and introduced to the first air supply pipe 15*a* via the heat exchange element 1900, to the air inlet 10_2 of the second room.

Thus, heat exchange may occur in the air conditioning control device 1000 without mixing the air of the first room with the air of the second room.

Referring to FIG. 11B, the air conditioning control device 1000 may recover thermal energy from a plurality of rooms and then may supply the thermal energy to the second room.

The air conditioning control device 1000 may determine Room 5 as well as Room 1 as the first room from which thermal energy is to be recovered.

The air conditioning control device 1000 may introduce the air of Room 5, sucked through the air outlet 20_5 of Room 5, to the first air exhaust pipe 25*a* by controlling the air exhaust pipeline control unit 65_5 in addition to controlling the pipeline control units 55_1, 55_2, 65_1, and 65_2 of Room 1 and Room 2 described in FIG. 11A. Thus, the air of Room 1 and the air of Room 2 sucked to the first air exhaust pipe 25*a* may be mixed and then may be introduced to the second air supply pipe 15*b* through the heat exchange element 1900. In the heat exchange element 1900, heat exchange may be achieved between a mixture of the air of Room 1 and the air of Room 5 and the air of Room 2.

The air conditioning control device 1000 may control the air supply pipeline control unit 55_5 of Room 5 to introduce the mixed air of Room 1 and Room 5 introduced to the second air supply pipe 15*b* to the air inlet 10_5 of the fifth room as well as the air inlet 10_1 of Room 1.

Thus, the air conditioning control device 1000 may recover thermal energy of Room 1 and Room 5 and supply the thermal energy to Room 2.

According to an embodiment of the disclosure, the air conditioning control device 1000 may supply thermal energy of one room to a plurality of rooms or supply thermal energy of a plurality of rooms to the plurality of rooms, by controlling the pipeline control units 55_1 to 55_5 and 65_1 to 65_5.

Figure 12:
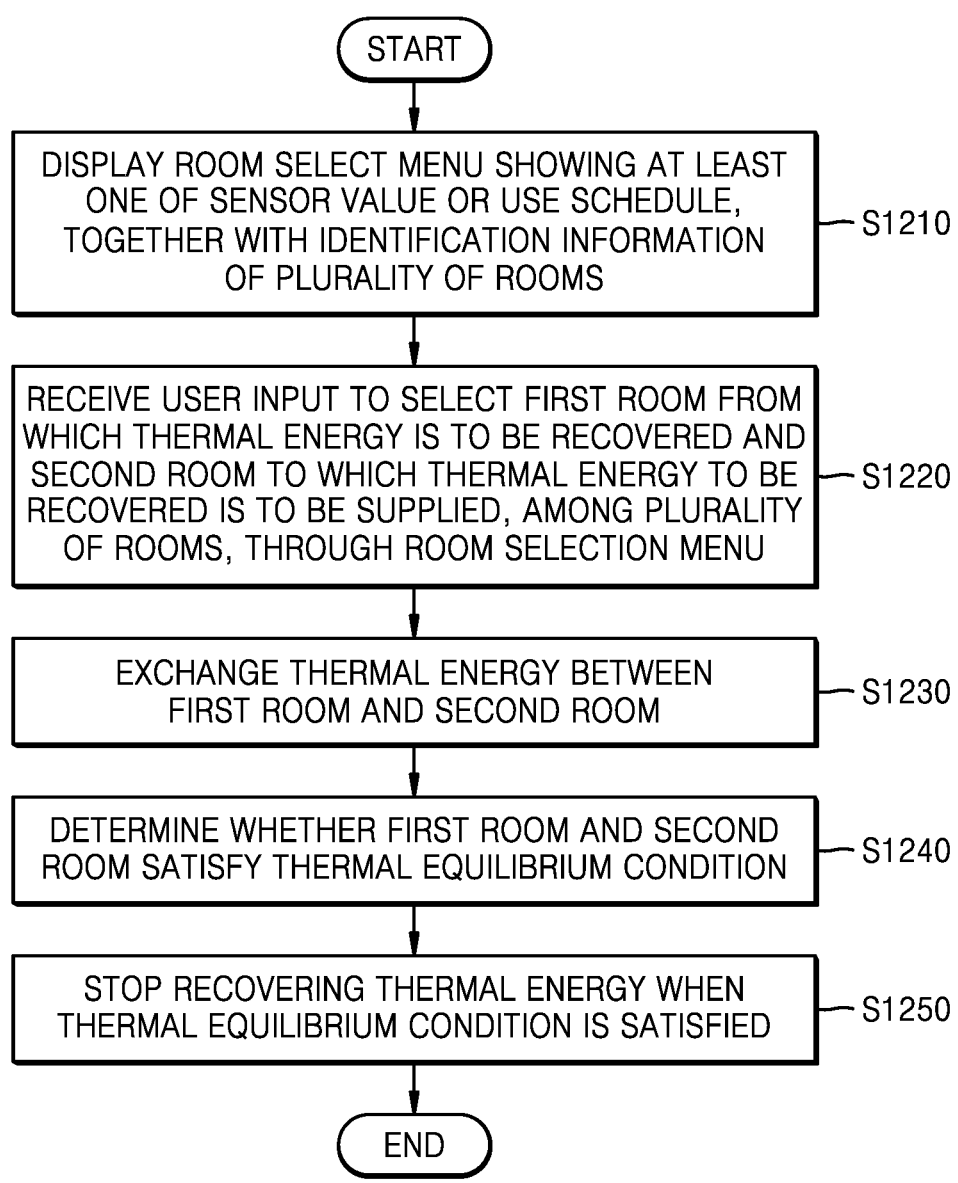
FIG. 12 is a flowchart of a method, performed by an air conditioning control device, of reusing waste heat in a room, according to an embodiment of the disclosure.

FIG. 12 is a flowchart of a method, performed by an air conditioning control device, of reusing waste heat in a room, based on a user input, according to an embodiment of the disclosure.

In operation S1210, the air conditioning control device 1000 may display a room selection menu showing at least one of a sensor value or a use schedule together with identification information of a plurality of rooms.

The sensor value may include a temperature and a humidity. The sensor value may include a human body detection sensor value indicating whether a user is present in a room, whether the user enters the room, or whether the user leaves the room. The sensor value may include an air quality sensor value indicating the degree of pollution of the air in the room.

The use schedule may include a scheduled use start time, a scheduled use end time, a scheduled use period, etc.

The air conditioning control device 1000 may display a room selection menu showing at least one of a sensor value or a use schedule of each room, together with identification information of the plurality of rooms.

In operation S1220, the air conditioning control device 1000 may receive a user input to select a first room from which thermal energy is to be recovered and a second room to which thermal energy is to be supplied, from among the plurality of rooms, through the room selection menu.

In operation S1230, the air conditioning control device 1000 may exchange the thermal energy between the first room and the second room. In operation S1240, the air conditioning control device 1000 may determine whether the first room and the second room satisfy the thermal equilibrium condition. In operation S1250, the air conditioning control device 1000 may stop recovery of thermal energy as the thermal equilibrium condition is satisfied. Operations S1230 and S1250 may be described with reference to operation S320 of FIG. 3 and FIG. 4 or 7.

Figure 13:
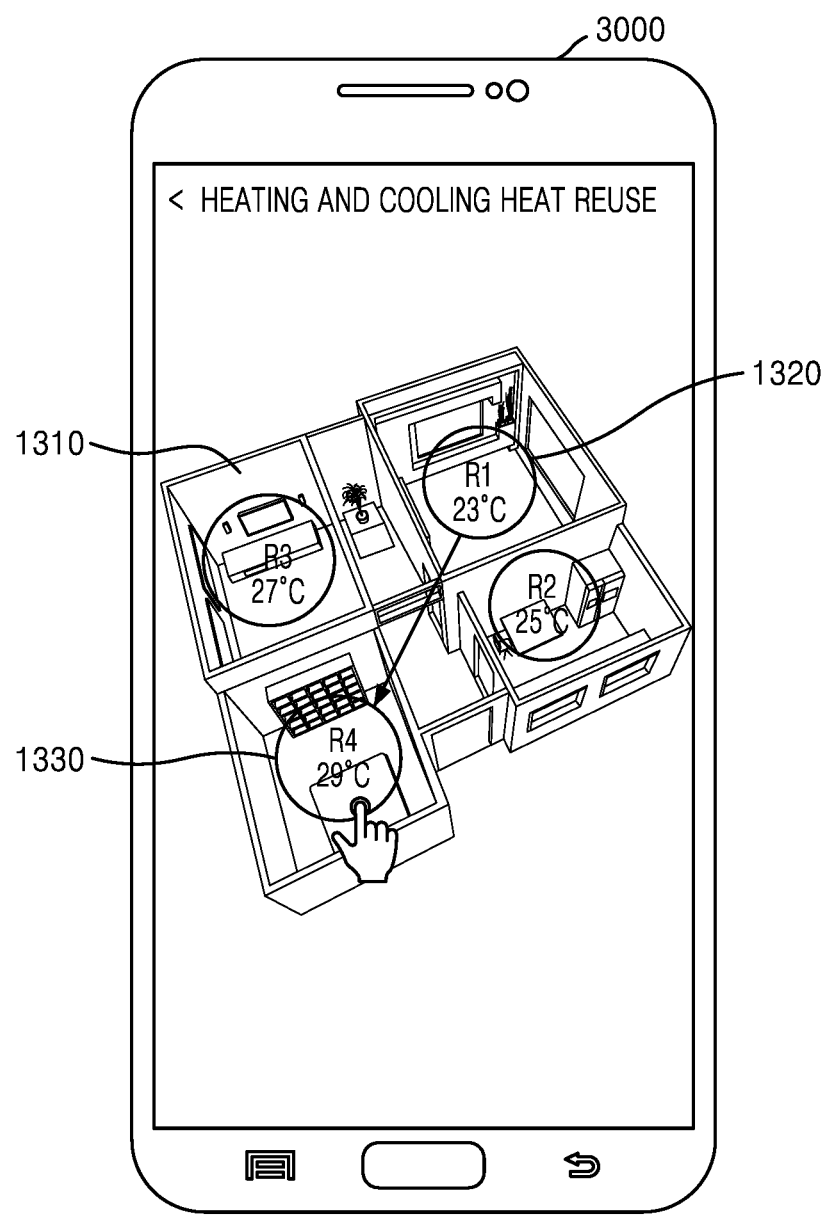
FIG. 13 illustrates a method of reusing heating and cooling heat in a room by using a user device, according to an embodiment of the disclosure.

FIG. 13 illustrates a method of displaying a menu for reusing heating and cooling heat in a room by using a user device, according to an embodiment of the disclosure.

Referring to FIG. 13, a user device 3000 may provide a user menu for reusing heating and cooling heat in a room.

The user device 3000 may include, but is not limited to, a mobile device, a tablet personal computer (PC), a desktop PC, a wall pad, etc. The air conditioning control device 1000 may include the user device 3000. For example, the user device 3000 may be one of user input units of the air conditioning control device 1000.

The user device 3000 may transmit and receive information to and from the air conditioning control device 1000 using short-range wireless communication or through a server.

When receiving a user input to select a heating and cooling heat reuse menu, the user device 3000 may display identification information of a room in a house and a current temperature of the room. In this case, the user device 3000 may display a stereoscopic view 1310 or a plan view of a house or a building.

According to an embodiment of the disclosure, the air conditioning control device 1000 may display information regarding the quality of the air of the room (a $CO_2$ concentration, a dust concentration, a harmful gas concentration, etc.). According to an embodiment of the disclosure, the air conditioning control device 1000 may display information regarding the user in the room (whether the user is present in the room, the number of users, etc.).

The user device 3000 may receive a user input to select at least one room for thermal energy exchange. For example, when receiving a user input to select Room R1 1320 and Room R4 1330 by drag and drop, the user device 3000 may determine Room R1 1320 as the first room from which thermal energy is to be recovered and determine Room R4 1330 as the second room to which thermal energy is to be supplied. The user device 3000 may transmit, to the air conditioning control device 1000, identification information of Room R1 1320 and Room R4 1330 and information indicating that Room R1 1320 is a room from which thermal energy is to be recovered and Room R4 1330 is a room to which thermal energy is to be supplied. When receiving information about rooms between which thermal energy is to be exchanged from the user device 3000, the air conditioning control device 1000 may exchange thermal energy between Room R1 1320 and Room R4 1330.

In another embodiment of the disclosure, when receiving a user input to select a plurality of rooms, the user device 3000 may determine the plurality of selected rooms as rooms between which thermal energy is to be exchanged. The user device 3000 may transmit, to the air conditioning control device 1000, identification information of the plurality of rooms between which thermal energy is to be exchanged. When receiving information about rooms between which thermal energy is to be exchanged from the user device 3000, the air conditioning control device 1000 may control a ventilation fan, an air supply regulator, and an air exhaust regulator to exchange thermal energy between the plurality of rooms.

Figure 14:
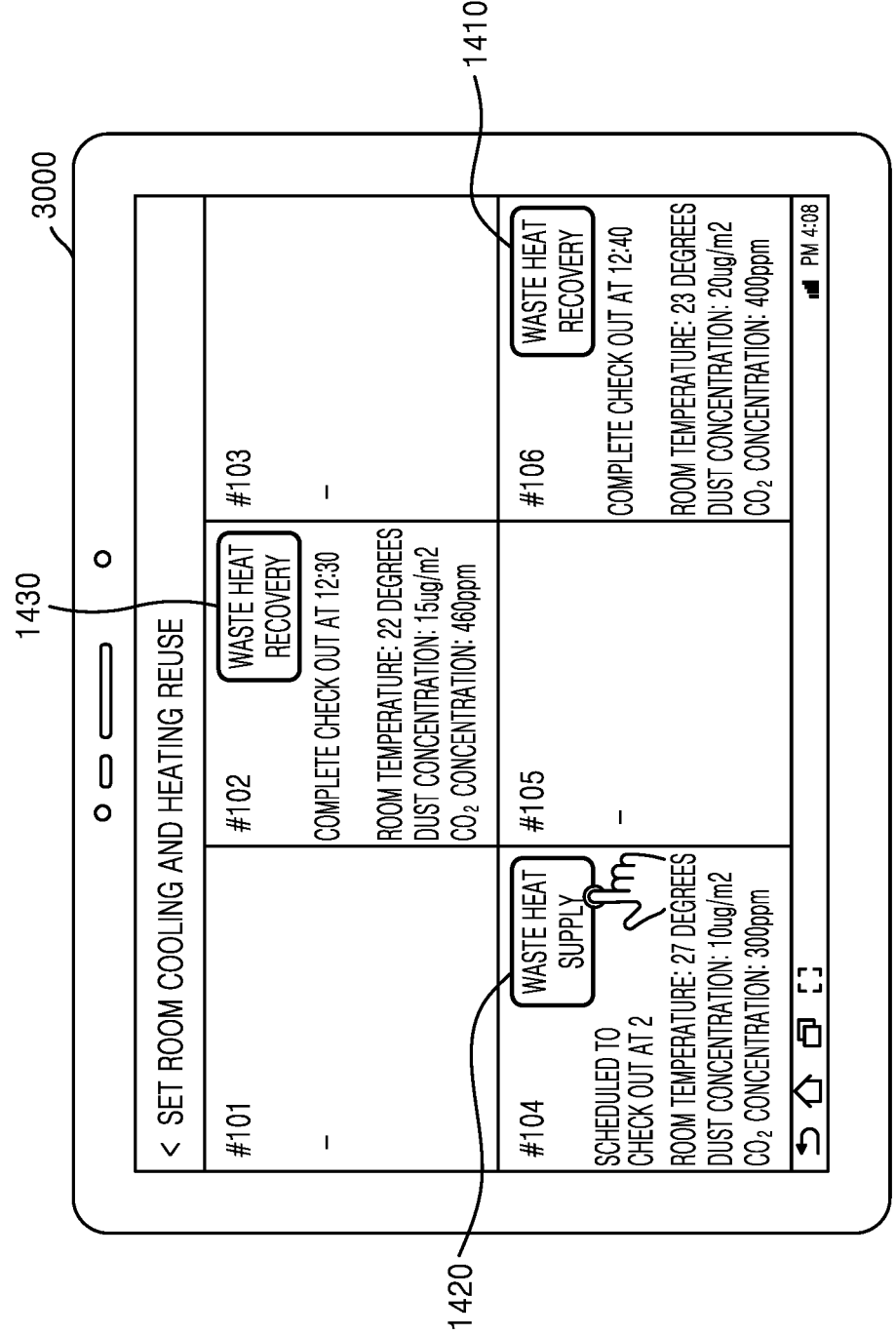
FIG. 14 illustrates a method of reusing heating and cooling heat in a room by using a user device, according to another embodiment of the disclosure.

FIG. 14 illustrates a method of reusing heating and cooling heat in a room by using a user device, according to another embodiment of the disclosure.

Referring to FIG. 14, a room according to an embodiment of the disclosure may be a room for which a use time is preset, such as a hotel room, a classroom, etc. The user device 3000 may provide a room cooling and heating reuse use menu to reuse waste heat in a room, based on a use schedule of the room.

When receiving a user input to select the room cooling and heating reuse use menu, the user device 3000 may display identification information of the room, the temperature of the room, information about the quality of the air, a use end time, or a scheduled use start time.

The user device 3000 may determine a room from which thermal energy is to be recovered and a room to which thermal energy is to be supplied, based on a use schedule of the room, the temperature of the room, and the quality of the air. For example, the user device 3000 may determine a room having the remaining thermal energy among rooms that are not scheduled to be used for a specific time from the end of the use, as a room from which thermal energy is to be recovered, based on the temperature of the rooms. For example, the user device 3000 may determine that thermal energy remains in the room, when an inside temperature is in the opposite direction to the outside temperature with respect to a reference temperature. More specifically, the air conditioning control device 1000 may determine that the thermal energy remains in the room, when a sign of a value obtained by subtracting the reference temperature from the outside temperature is different from a sign of a value obtained by subtracting the reference temperature from the inside temperature. For example, when the reference temperature is 25 degrees, the outside temperature is 29 degrees, and the indoor temperature of the room is 23 degrees, it may be determined that cold energy remains in the room.

In addition, the user device 3000 may determine, as a room to which thermal energy is to be supplied, a room requiring thermal energy among rooms scheduled to be used within a specific time. For example, the user device 3000 may determine the room as the room to which thermal energy is to be supplied, when the inside temperature is in the same direction as the outside air with respect to the reference temperature. For example, the air conditioning control device 1000 may determine the room as the room to which thermal energy is to be supplied, when the sign of the value obtained by subtracting the reference temperature from the outside temperature is equal to the sign of the value obtained by subtracting the reference temperature from the inside temperature.

The user device 3000 may display a user interface 1420 (e.g., a "waste heat supply" button) for supplying the remaining thermal energy to another room in correspondence to the identification information of the room in which the thermal energy remains. The user device 3000 may display a user interface 1410 (e.g., a "waste heat recovery"

button) for receiving thermal energy from another room in correspondence to the identification information of the room from which thermal energy may be supplied.

When receiving a user input to select the waste heat recovery buttons 1410 and 1430 and the waste heat supply button 1420, the user device 3000 may transmit identification information of selected rooms to the air conditioning control device 1000.

The air conditioning control device 1000 may recover thermal energy remaining in at least one room to at least one another room by exchanging thermal energy of the selected rooms based on the identification information received from the user device 3000.

Figure 15:
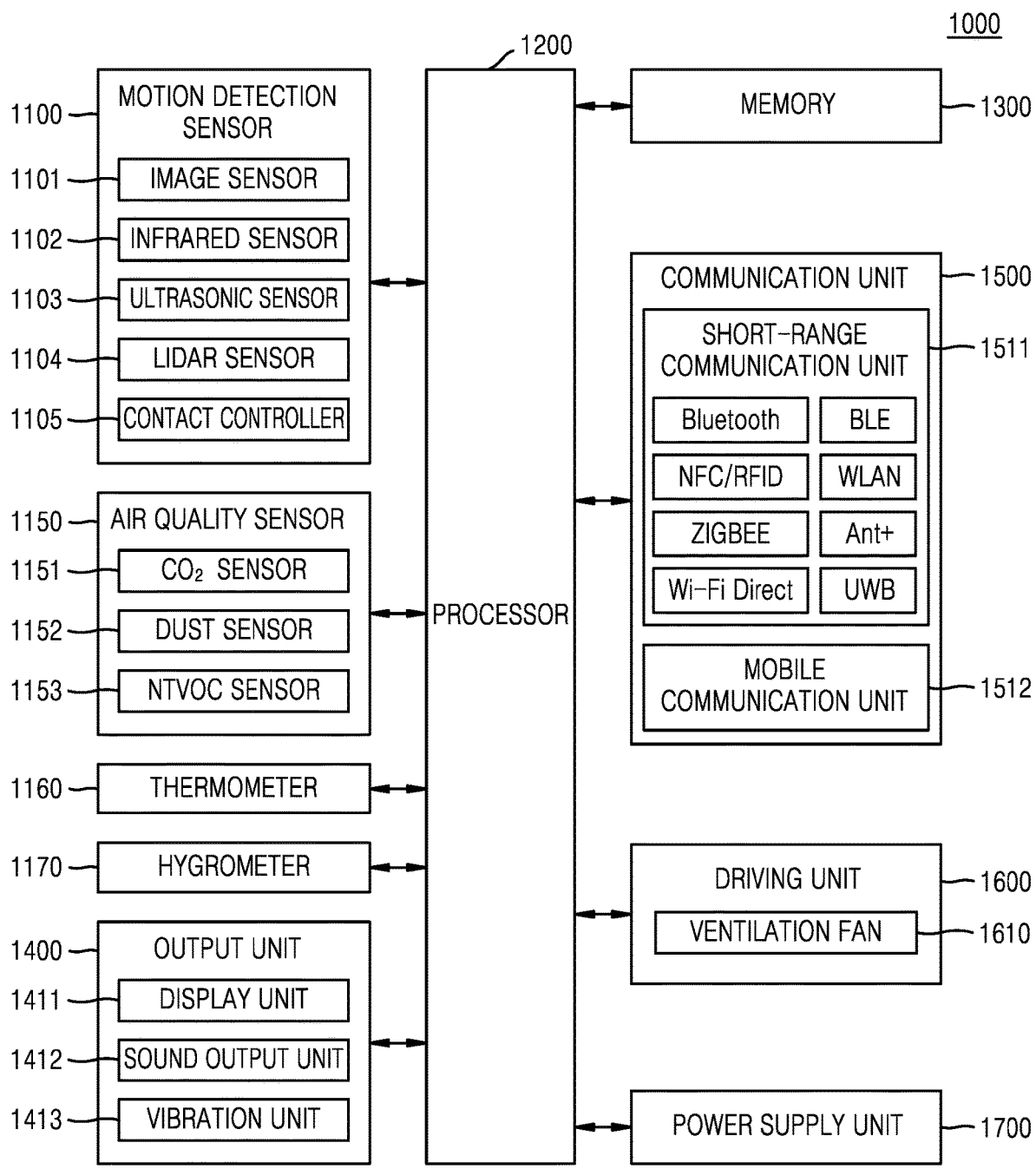
FIG. 15 is a device diagram of an air conditioning control device, according to another embodiment of the disclosure.

FIG. 15 is a device diagram of an air conditioning control device, according to another embodiment of the disclosure.

Referring to FIG. 15, the air conditioning control device 1000 may include a human body detection sensor 1100, an air quality sensor 1150, a thermometer 1160, a hygrometer 1170, a processor 1200, a memory 1300, an output unit 1400, a communication unit 1500, a driving unit 1600, and a power supply unit 1700. However, all of the components shown in FIG. 15 are not essential components of the air conditioning control device 1000. The air conditioning control device 1000 may be implemented with more components than those shown in FIG. 15 or may be implemented with fewer components than those shown in FIG. 15. Each component will be described sequentially.

The human body detection sensor 1100 may include a plurality of sensors configured to detect information regarding whether a user is present in a room, whether the user enters the room, and whether the user leaves the room. For example, the human body detection sensor 1100 may include, but is not limited to, an image sensor 1101 (e.g., a stereo camera, a mono camera, a wide angle camera, an around-view camera, a 3D vision sensor, etc.), an infrared sensor 1102, an ultrasonic sensor 1103, a lidar sensor 1104, a contact controller 1105, etc. Several image sensors 1101 may be arranged in a room according to an implementation example. A function of each sensor may be intuitively construed from a name of the sensor by those of ordinary skill in the art, and thus will not be described in detail.

The air quality sensor 1150 may include a $CO_2$ sensor 1151, a dust sensor 1152, and a TVOC sensor 1153. The $CO_2$ sensor 1151 may detect the concentration of $CO_2$ in the air in a room. The dust sensor 1152 may detect the concentration of dust in the air in the room. The TVOC sensor 1153 may detect the concentration of harmful gases and the concentration of organic compounds in the air in the room.

The thermometer 1160, the hygrometer 1170, the human body detection sensor 1100, and the air quality sensor 1150 may be arranged in the room to be wirelessly or wiredly connected to the processor 1200.

The processor 1200 may generally control overall operations of the air conditioning control device 1000. The processor 1200, by executing programs stored in the memory 1300, may control the human body detection sensor 1100, the air quality sensor 1150, the thermometer 1160, the hygrometer 1170, the output unit 1400, the communication unit 1500, the driving unit 1600, and the power supply unit 1700.

According to an embodiment of the disclosure, the processor 1200 may include an artificial intelligence (AI) processor. The AI processor may be manufactured in the form of a dedicated hardware chip for AI or may be manufactured as a part of an existing general-purpose processor (e.g., a central processing unit (CPU) or an application processor) or a graphic processor (e.g., a graphics processing unit (GPU)) and mounted on the air conditioning control device 1000.

The memory 1300 may store a program for processing and control by the processor 1200, and store identification information of a room and identification information of an air inlet regulator (not shown) and an air outlet regulator (not shown) corresponding to the identification of the room.

The memory 1300 may include a storage medium of at least one type of a flash memory type, a hard disk type, a multimedia card micro type, a card type memory (e.g., a secure digital (SD) or extreme digital (XD) memory, etc.), a random access memory (RAM), a static random access memory (SRAM), a read-only memory (ROM), an electrically erasable programmable read-only memory (EEPROM), a programmable read-only memory (PROM), a magnetic memory, a magnetic disc, an optical disc, or the like. The air conditioning control device 1000 may operate a web storage or a cloud server that performs a storage function on the Internet.

The output unit 1400 may be intended to output an audio signal, a video signal, or a vibration signal, and may include a display 1411, an audio output unit 1412, a vibration motor 1413, and so forth.

The display 1411 may display information processed by the air conditioning control device 1000. For example, the display 1411 may display identification information of the room, the temperature of the room, the humidity of the room, the human body detection sensor value, and the air quality sensor value, and display the use schedule of the room, whether the user is present in the room or the user leaves the room, etc.

The display 1411 may display a user interface (UI) or a graphical user interface (GUI), related to thermal energy exchange.

Meanwhile, when the display 1411 and a touch pad are constructed as a touch screen in a layer structure, the display 1411 may be used as an input device as well as an output device. The display 1411 may include at least one of a liquid crystal display (LCD), a thin film transistor (TFT) LCD, an organic light-emitting diode (OLED), a flexible display, a three-dimensional (3D) display, or an electrophoretic display. According to implementation types of the air conditioning control device 1000, the air conditioning control device 1000 may include two or more displays 1411.

The audio output unit 1412 may output audio data received from the communication unit 1500 or stored in the memory 1300. In addition, the audio output unit 1412 may output an audio signal related to a function performed in the air conditioning control device 1000. For example, the audio output unit 1412 may output a voice message indicating that thermal energy exchange between rooms is to start or a voice message indicating that rooms enter the thermal equilibrium state and thus heat exchange is to be stopped. The audio output unit 1412 may include a speaker, a buzzer, or the like.

The vibration unit 1413 may output a vibration signal. For example, the vibration unit 1413 may output a vibration signal corresponding to output of audio data or video data (e.g., an alert message, etc.).

The communication unit 1500 may include at least one antenna for wirelessly communicating with other devices (e.g., various sensors, a server device (not shown), other display devices (not shown), and a plurality of appliances (not shown)). For example, the communication unit 1500 may include, but is not limited to, a short-range wireless communication unit 1511, a mobile communication unit 1512, etc.

The short-range wireless communication unit 1511 may include a Bluetooth Low Energy (BLE) communication unit, a near field communication (NFC) unit, a wireless local area network (WLAN) (WiFi) communication unit, a Zig-Bee communication unit, an infrared Data Association (IrDA) communication unit, a WiFi Direct (WFD) communication unit, an ultra wideband (UWB) communication unit, an Ant+ communication unit, a microwave (uWave) communication unit, etc., without being limited thereto.

The mobile communicator 1512 may transmit and receive a radio signal to and from at least one of a base station, an external terminal, or a server over a mobile communication network. Herein, the radio signal may include various forms of data corresponding to transmission/reception of a voice call signal, a video communication call signal, or a text/multimedia message.

The driving unit 1600 may include components used in driving (operation) of the air conditioning control device 1000 and operations of internal devices of the air conditioning control device 1000. The driving unit 1600 may include an air inlet regulator (not shown), an air outlet regulator (not shown), and the ventilation fan 1610.

According to an embodiment of the disclosure, the air conditioning control device 1000 may include a user input unit (not shown). The user input unit may be a means through which a user inputs data for controlling the air conditioning control device 1000. For example, the user input unit may include, but is not limited to, a keypad, a dome switch, a touch pad (a capacitive overlay type, a resistive overlay type, an infrared beam type, a surface acoustic wave type, an integral strain gauge type, a piezoelectric effect type, etc.), a jog wheel, a jog switch, etc.

The machine-readable storage medium may be provided in the form of a non-transitory storage medium. Wherein, the term 'non-transitory storage medium' simply means that the storage medium is a tangible device and does not include a signal (e.g., an electromagnetic wave), but this term does not differentiate between where data is semi-permanently stored in the storage medium and where the data is temporarily stored in the storage medium. For example, the 'non-transitory storage medium' may include a buffer in which data is temporarily stored.

According to an embodiment, the method according to various embodiments disclosed herein may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Samsung Store™), or between two user devices (e.g., smart phones) directly. When distributed online, at least a part of the computer program product (e.g., a downloadable app) may be at least temporarily stored or temporarily generated in the machine-readable storage medium, such as memory of the manufacturer's server, a server of the application store, or a relay server.

What is claimed is:

1. An air conditioning control device comprising:
a memory storing at least one instruction; and
at least one processor configured to, by executing the at least one instruction:
determine, among a plurality of rooms, a first room from which thermal energy is to be recovered and a second room to which the thermal energy to be recovered is to be supplied, based on at least one of a sensor value of a sensor in a room among the plurality of rooms, a use schedule of at least one room among the plurality of rooms, and a user input, and
drive a ventilation fan to suck air of the first room through an air outlet of the first room, to suck air of the second room through an air outlet of the second room, to exchange thermal energy between the sucked air of the first room and the sucked air of the second room, and to discharge the air of the first room and the air of the second room in which the thermal energy is exchanged, to an air inlet of the first room and an air inlet of the second room.

2. The air conditioning control device of claim 1, wherein to exchange thermal energy between the sucked air of the first room and the sucked air of the second room, the at least one processor is configured to, by executing the at least one instruction, drive the ventilation fan to mix the sucked air of the first room with the sucked air of the second room, and
to discharge the air of the first room and the air of the second room in which the thermal energy is exchanged, the at least one processor is configured to, by executing the at least one instruction, discharge the sucked air of the first room and the sucked air of the second room, which are mixed, to the air inlet of the first room and the air inlet of the second room.

3. The air conditioning control device of claim 2, wherein the ventilation fan is between an air exhaust pipe connecting air outlets of the plurality of rooms and an air supply pipe connecting air inlets of the plurality of rooms, and
to mix the sucked air of the first room with the sucked air of the second room and to discharge the sucked air of the first room and the sucked air of the second room, which are mixed, the at least one processor is further configured to, by executing the at least one instruction:
open the air inlets and the air outlets of the first room and the second room and close air inlets and air outlets of rooms other than the first room and the second room among the plurality of rooms, and
drive the ventilation fan to mix the sucked air of the first room with the sucked air of the second room in the air exhaust pipe and the air supply pipe, and circulate the mixed air between the first room and the second room.

4. The air conditioning control device of claim 1, further comprising:
a heat exchange element, wherein
to exchange thermal energy between the sucked air of the first room and the sucked air of the second room, the at least one processor is configured to, by executing the at least one instruction, cause the sucked air of the first room and the sucked air of the second room to pass through the heat exchange element, and
to discharge the air of the first room and the air of the second room in which the thermal energy is exchanged, the at least one processor is configured to, by executing the at least one instruction, discharge the sucked air of the first room in which the thermal energy is exchanged to the air inlet of the first room, and discharge the air of the second room in which the thermal energy is exchanged to the air inlet of the second room.

5. The air conditioning control device of claim 4, wherein the at least one processor is further configured to, by executing the at least one instruction, perform the exchange of thermal energy and air conditioning together by mixing the sucked air of the second room with outside air prior to the sucked air of the second room being passed through the heat exchange element.

6. The air conditioning control device of claim 4, wherein the at least one processor is further configured to, by executing the at least one instruction, cause the exchange of thermal energy and cooling and heating to be performed together, by controlling an air conditioning unit in the second room together with the exchange of thermal energy.

7. The air conditioning control device of claim 4, wherein
each room of the plurality of rooms has a corresponding first pipeline control unit and a corresponding second pipeline control unit,
each room of the plurality of rooms has an air outlet connectable to an air exhaust pipe or a heat recovery air exhaust pipe by the corresponding first pipeline control unit,
each room of the plurality of rooms has an air inlet connectable to an air supply pipe or a heat recovery air supply pipe by the corresponding second pipeline control unit,
the air exhaust pipe is connected to the heat recovery air supply pipe and the air supply pipe is connected to the heat recovery air exhaust pipe, in the heat exchange element, and
the at least one processor is further configured to, by executing the at least one instruction, control the first pipeline control unit and the second pipeline control unit corresponding to each room of the plurality of rooms, in association with driving of the ventilation fan, to exchange thermal energy between the sucked air of the first room and the sucked air of the second room.

8. The air conditioning control device of claim 1, wherein the at least one processor is further configured to, by executing the at least one instruction, stop driving the ventilation fan as a difference between a temperature of the first room and a temperature of the second room decreases to a preset temperature difference or less.

9. The air conditioning control device of claim 1, further comprising:
a user input unit,
wherein the at least one processor is further configured to, by executing the at least one instruction:
receive a user input to set an energy recovery threshold time through the user input unit, and
stop driving the ventilation fan as the set energy recovery threshold time has elapsed since start of driving of the ventilation fan.

10. The air conditioning control device of claim 1, further comprising:
a user input unit and a display,
wherein the at least one processor is further configured to, by executing the at least one instruction:
display, on the display, a room selection menu showing at least one of the sensor value and the use schedule, together with identification information of the plurality of rooms, and
receive a user input to select the first room from which thermal energy is to be recovered and the second room to which thermal energy is to be supplied, from among the plurality of rooms, through the user input unit.

11. A method comprising:
determining, among a plurality of rooms, a first room from which thermal energy is to be recovered and a second room to which the thermal energy to be recovered is to be supplied, based on at least one of a sensor value of a sensor in a room among the plurality of rooms, a use schedule of at least one room among the plurality of rooms, and a user input; and
driving a ventilation fan to suck air of the first room through an air outlet of the first room, to suck air of the second room through an air outlet of the second room, to exchange thermal energy between the sucked air of the first room and the sucked air of the second room, and to discharge the air of the first room and the air of the second room in which the thermal energy is exchanged to an air inlet of the first room and an air inlet of the second room.

12. The method of claim 11, wherein
the driving the ventilation fan to exchange thermal energy between the sucked air of the first room and the sucked air of the second room comprises driving the ventilation fan to mix the sucked air of the first room with the sucked air of the second room, and
the driving the ventilation fan to discharge the air of the first room and the air of the second room in which the thermal energy is exchanged comprises driving the ventilation fan to discharge the sucked air of the first room and the sucked air of the second room, which are mixed, to the air inlet of the first room and the air inlet of the second room.

13. The method of claim 12, wherein
the ventilation fan is between an air exhaust pipe connecting air outlets of the plurality of rooms and an air supply pipe connecting air inlets of the plurality of rooms, and
the driving the ventilation fan to mix the sucked air of the first room with the sucked air of the second room and the driving the ventilation fan to discharge the sucked air of the first room and the sucked air of the second room, which are mixed, comprises:
opening the air inlets and the air outlets of the first room and the second room, closing air inlets and air outlets of rooms other than the first room and the second room among the plurality of rooms, and
driving the ventilation fan to mix the sucked air of the first room with the sucked air of the second room in the air exhaust pipe and the air supply pipe, and to circulate the mixed air between the first room and the second room.

14. The method of claim 11, wherein
to exchange thermal energy between the sucked air of the first room and the sucked air of the second room, the driving the ventilation fan comprises driving the ventilation fan to cause the sucked air of the first room and the sucked air of the second room to pass through a heat exchange element, and
to discharge the air of the first room and the air of the second room in which the thermal energy is exchanged, the driving the ventilation fan comprises driving the ventilation fan to discharge the sucked air of the first room in which thermal energy is exchanged to the air inlet of the first room, and to discharge the air of the second room in which thermal energy is exchanged to the air inlet of the second room.

15. The method of claim 14, wherein the driving the ventilation fan to exchange thermal energy between the sucked air of the first room and the sucked air of the second room comprises driving the ventilation fan to cause the exchange of thermal energy and air conditioning to be performed together by mixing the sucked air of the second room with outside air prior to the sucked air of the second room being passed through the heat exchange element.

16. The method of claim 14, further comprising:
performing thermal energy exchange and cooling and heating together by controlling an air conditioning unit in the second room.

17. The method of claim 14, wherein
each room of the plurality of rooms has a corresponding first pipeline control unit and a corresponding second pipeline control unit,
each room of the plurality of room has an air outlet connectable to an air exhaust pipe or a heat recovery air exhaust pipe by the corresponding first pipeline control unit,
each room of the plurality of rooms has an air inlet connectable to an air supply pipe or a heat recovery air supply pipe by the corresponding second pipeline control unit,
the air exhaust pipe is connected to the heat recovery air supply pipe and the air supply pipe is connected to the heat recovery air exhaust pipe, in the heat exchange element, and
to exchange thermal energy between the sucked air of the first room and the sucked air of the second room, the method comprises controlling the first pipeline control unit and the second pipeline control unit corresponding to each room of the plurality of rooms, in association with driving of the ventilation fan, to exchange thermal energy between the sucked air of the first room and the sucked air of the second room.

18. The method of claim 11, further comprising:
stopping driving the ventilation fan as a difference between a temperature of the first room and a temperature of the second room decreases to a preset temperature difference or less.

19. The method of claim 11, further comprising:
receiving a user input to set an energy recovery threshold time; and
stopping driving the ventilation fan as the set energy recovery threshold time has elapsed since start of driving of the ventilation fan.

20. The method of claim 11, further comprising:
displaying a room selection menu showing at least one of the sensor value or the use schedule, together with identification information of the plurality of rooms; and
receiving a user input to select the first room from which thermal energy is to be recovered and the second room to which thermal energy is to be supplied, from among the plurality of rooms, through the room selection menu.

* * * * *